United States Patent [19]
Ukai et al.

[11] Patent Number: 6,135,862
[45] Date of Patent: Oct. 24, 2000

[54] NITROGEN GAS SUPPLY SYSTEM FOR DRY-CUT WORKING MACHINE

[75] Inventors: Hisashi Ukai; Toshiyuki Suzuki; Takayuki Suzuki, all of Hamamatsu, Japan

[73] Assignee: Enshu Ltd., Tokyo, Japan

[21] Appl. No.: 09/310,730

[22] Filed: May 13, 1999

[30] Foreign Application Priority Data

| | | | |
|---|---|---|---|
| May 13, 1998 | [JP] | Japan | 10-148454 |
| Jul. 28, 1998 | [JP] | Japan | 10-227670 |

[51] Int. Cl.⁷ .................................................... B24B 1/00
[52] U.S. Cl. ............................................. 451/53; 451/177
[58] Field of Search .............................. 451/53, 449, 488, 451/177; 83/169; 407/11; 408/56, 61; 409/135, 136

[56] References Cited

U.S. PATENT DOCUMENTS

| | | | |
|---|---|---|---|
| 2,635,399 | 4/1953 | West, Jr. .................................. 451/449 |
| 4,548,799 | 10/1985 | Knoblauch et al. . | |
| 4,563,924 | 1/1986 | Runkle et al. . | |
| 5,226,931 | 7/1993 | Combier . | |
| 5,228,369 | 7/1993 | Itoh et al. ................................. 82/1.11 |
| 5,291,693 | 3/1994 | Nguyen .................................... 451/41 |
| 5,472,480 | 12/1995 | Barbe . | |
| 5,645,382 | 7/1997 | Homanick et al. ..................... 409/131 |

FOREIGN PATENT DOCUMENTS

| | | |
|---|---|---|
| 4563924 | 1/1986 | Germany . |
| 60-033893 | 2/1985 | Japan . |
| 63-62339 | 12/1988 | Japan . |
| 275321 | 12/1991 | Japan . |
| 5-220665 | 8/1993 | Japan . |
| 07-060621 | 7/1995 | Japan . |
| 2568975 | 10/1996 | Japan . |
| 10-249640 | 9/1998 | Japan . |
| WO-9533594 | 12/1995 | WIPO . |

OTHER PUBLICATIONS

European Search Report dated Apr. 7, 2000.

*Primary Examiner*—Derris H. Banks
*Attorney, Agent, or Firm*—McGinn & Gibb, P.C.

[57] ABSTRACT

A nitrogen gas supply system for dry-cut working machine, comprising a nitrogen gas generator for separating and extracting only nitrogen gas from the atmosphere, and a supplier for sending the extracted nitrogen gas to a working part. The nitrogen gas obtained from the atmosphere can effectively be supplied to a workpiece.

30 Claims, 20 Drawing Sheets

FIG.7

| Item | Characteristic |
|---|---|
| Nitrogen gas concentration | 95% |
| Nitrogen gas yield | 15Nm$^3$/h continuous |
| Nitrogen gas pressure | 4.0kg/cm$^2$ |
| Nitrogen gas dewpoint | -30°C |
| Source air temperature | room temperature |
| Source air pressure | 3.0kg/cm$^2$ (Intensified=6.0Kg/cm$^2$) |
| Source air dew point | -10°C |
| FLOW METER RANGE | 20.0Nm$^3$/h |
| Power supply | 100V 50/60Hz |
| Power consumption | Heater 800W |

NITROGEN GAS SUPPLY SYSTEM FOR DRY-CUT WORKING MACHINE

BACKGROUND OF THE INVENTION

1. Field of the Invention

The present invention relates to a nitrogen gas supply system for dry-cut working apparatus which supplies nitrogen gas to a machining part or to a tip of a tool attached to a working machine such as a machining center, milling machine, lathe, gear cutting machine, grinding machine, etc.

2. Description of the Related Art

The cooling of a tool attached to a spindle of a working machine in a prior art is carried out by injection of cutting liquid (liquid coolant) from a nozzle of a working machine to a top of the tool, in order to maintain the less friction and the lower temperature of the tool, thereby the effective cutting and the long tool life may be obtained.

In the thus mentioned method of cooling of the tool by using the cutting liquid (liquid coolant), the disposal of sludge is required. However, since the sludge incorporates the perished liquid coolant, it is difficult to dispose of the waste liquid. Further, since the cutting liquid (liquid coolant) is recycled, the liquid may gradually rise in temperature, which may cause thermal expansion of any part of the machine. This is one of the major causes which would spoil the accuracy of machining.

To overcome the above problem, there has been provided a "dry-cut" method which blows non-combustible gas to a working point, as disclosed in the Japanese patent publication after examination (Kokoku) No. Sho 63-62339 or the Japanese patent No. 2568975. In particular, the dry-cut method by non-combustible gas as according to the Japanese patent No. 2568975 has several merits, that the machining part may be being prevented from being oxidized, and that the danger of being ignited due to oil mist may be prevented. However, according to the Japanese patent No. 2568975, the non-combustible gas is supplied from an inert gas tank. Further, according to the above discussed publication No. Sho 63-62339, a tank 11 filled with liquid nitrogen is heated so that the vaporized nitrogen gas may blow out of the tank 11. These system will require more expensive running costs and wider space for installing such a tank. In addition, when the nitrogen gas consumption increases, the replacement of tank or the replenishment of nitrogen gas will frequently be required. Therefore the continuous supply of the nitrogen gas cannot be carried out, thus the machining to workpieces should be disrupted many times.

SUMMARY OF THE INVENTION

In the light of problems which have been arisen from the nitrogen gas tanks for dry-cut according to the prior arts as above described, in which the continuous supply of nitrogen gas cannot be carried out, and much expensive running costs are required, the inventors have focused on the fact that there is the nitrogen gas existing in the ordinary air (the atmosphere) by almost 80% thereof Thus, the inventors succeeded in providing a nitrogen gas supply system, in which the air is compressed, and only the ingredient of nitrogen gas is separated and extracted from the obtained compressed air, so that this nitrogen gas may continuously be supplied to a machining part of the working machine or to a tool attached to the working machine.

Therefore it is a first object of the present invention to provide a nitrogen gas supply system for dry-cut working machine in which a nitrogen gas collected from the atmosphere is continuously be supplied to the machining part of the working machine or to the tool attached to the working machine. Further, it is a second object of the present invention to provide a nitrogen gas supply system for dry-cut working machine provided with several types of air compressing means in order to efficiently compress the air in the atmosphere. Further, it is a third object of the present invention to provide a nitrogen gas supply system for dry-cut working machine provided with a collection means which reuses (recycles) the nitrogen gas after collecting such a gas which has been supplied to the working machine.

To achieve the objects mentioned above, according to claim 1 of the present invention, there is provided a nitrogen gas supply system for dry-cut working machine, comprising a nitrogen gas generator for separating and extracting only nitrogen gas existing in the atmosphere, and a supplier for sending the nitrogen gas from the nitrogen gas generator to a working part of a working machine.

According to claim 2, there is provided a nitrogen gas supply system for dry-cut working machine, comprising a nitrogen gas generator for separating and extracting only nitrogen gas existing in the atmosphere, a supplier for sending the nitrogen gas from the nitrogen gas generator to a working machine, and blower for convergently blowing the nitrogen gas at a cutting tip in a working part of the working machine.

According to claim 3, there is provided the nitrogen gas supply system for dry-cut working machine of claim 1, wherein the nitrogen gas generator comprising a air compressing means for compressing the atmosphere to be about 0.2–1.0 Mpa (2–10 kg/cm$^2$) in order to obtain a compressed air, a drying means for removing oil, moisture, etc. from the compressed air, a extracting means for extracting only the nitrogen gas from the compressed air, and a gas concentration maintaining means provided with a flow control valve and flow volume meter or with a flow control valve and an oxygen concentration meter in order to maintain a concentration of the nitrogen gas to be within a range of 90%–100%.

According to claim 4, there is provided the nitrogen gas supply system for dry-cut working machine of claim 2, wherein the nitrogen gas generator comprising a air compressing means for compressing the atmosphere to be about 0.2–1.0 Mpa (2–10 kg/cm$^2$) in order to obtain a compressed air, a drying means for removing oil, moisture, etc. from the compressed air, a extracting means for extracting only the nitrogen gas from the compressed air, and a gas concentration maintaining means provided with a flow control valve and flow volume meter or with a flow control valve and an oxygen concentration meter in order to maintain a concentration of the nitrogen gas to be within a range of 90%–100%.

According to claims 5 and 6, there is provided the nitrogen gas supply system for dry-cut working machine of claim 3 or 4, wherein the air compressing means is a compressed air supply running through a factory via piping within a range of 0.4–0.8 Mpa (4–8 kg/cm$^2$).

According to claims 7 and 8, there is provided the nitrogen gas supply system for dry-cut working machine of claim 3 or 4, wherein the air compressing means is a compressed air supply running through a factory via piping within a range of 0.4–0.8 Mpa (4–8 kg/cm$^2$), and a pressure intensifying means for further intensifying pressure of the compressed air supply to be in a range of 0.6–1.0 Mpa (6–10 kg/cm$^2$).

According to claims 9 and 10, there is provided the nitrogen gas supply system for dry-cut working machine of claim 3 or 4, wherein the air compressing means is an air compressor for generating a compressed air within a range of 0.2–1.0 Mpa (2–10 kg/cm$^2$).

According to claims 11 and 12, there is provided the nitrogen gas supply system for dry-cut working machine of claim 3 or 4, wherein the extracting means is a filter element for separating only the nitrogen gas from the compressed air.

According to claims 13 and 14, there is provided the nitrogen gas supply system for dry-cut working machine of claim 3 or 4, wherein the extracting means is an absorption element for separating only the nitrogen gas from the compressed air.

According to claims 15 and 16, there is provided the nitrogen gas supply system for dry-cut working machine of claim 1 or 2, further comprising a breathing device as a collecting means for collecting said nitrogen gas after completion of working, and a piping as a transfer means for transferring a collected nitrogen gas to the air compressing means.

According to claims 17 and 18, there is provided the nitrogen gas supply system for dry-cut working machine of claim 15 or 16, wherein the collecting means comprising a breathing device and a filter.

According to claims 19 and 20, there is provided the nitrogen gas supply system for dry-cut working machine of claim 3 or 4, wherein the dry-cut working machine is a machining center, a milling machine or a gear cutting machine.

According to claims 21 and 22, there is provided the nitrogen gas supply system for dry-cut working machine of claim 3 or 4, wherein the dry-cut working machine is a lathe.

And according to claims 23 and 24, there is provided the nitrogen gas supply system for dry-cut working machine of claim 3 or 4, wherein the dry-cut working machine is a grinding machine for grinding a workpiece by a grinding tool.

With this structure, according to claim 1, it is possible to separate and extract only the nitrogen gas ingredient from the compressed air obtained by compressing the atmosphere, and this extracted nitrogen gas may be supplied to the machining part for the workpiece provided in the working machine by maintaining high concentration of the extracted nitrogen gas. Thus the machining point to the workpiece as well as the portion adjacent thereto are within the nitrogen gas atmosphere, in which no oxygen exists. Accordingly, the cooling effect and the oxidation resistance effect are given to the tool and the workpiece. Further, since the nitrogen gas is supplied after being collected from the atmosphere, the lower running costs and the continuous nitrogen gas supply can be accomplished.

According to claim 2, it is possible to separate and extract only the nitrogen gas ingredient from the compressed air obtained by compressing the atmosphere, and this extracted nitrogen gas may convergently be supplied to the tip of the tool of the working machine for machining to the workpiece, by maintaining high concentration of the extracted nitrogen gas. Thus the tool tip for machining to the workpiece may effectively become within the no-oxygen, nitrogen gas atmosphere, which gives the cooling effect and the oxidation resistance effect to the tool and the workpiece. Further, since the nitrogen gas is supplied after being collected from the atmosphere, the lower running costs and the continuous nitrogen gas supply can be accomplished.

According to claim 3, the atmosphere has been compressed to be the compressed air at 0.2–1.0 Mpa (2–10 kg/cm$^2$), then the obtained compressed air is purified by the drying means by which oil, moisture and dust are removed, and only the nitrogen gas ingredient is separated and extracted from this purified compressed air. The thus obtained nitrogen gas is maintained at the concentration of 90–100% by the gas concentration maintaining means, and is supplied to the machining part of the working machine. This nitrogen gas supply system can continuously supply the nitrogen gas to the machining part of the working machine after the nitrogen gas being separated and extracted from the from the atmosphere, thus the lower running costs therefor may be accomplished.

According to claim 4, the atmosphere has been compressed to be the compressed air at 0.2–1.0 Mpa (2–10 kg/cm$^2$), then the obtained compressed air is purified by the drying means by which oil, moisture and dust are removed, and only the nitrogen gas ingredient is separated and extracted from this purified compressed air. The thus obtained nitrogen gas is maintained at the concentration of 90–100% by the gas concentration maintaining means, and is convergently supplied to the tool tip in the machining part of the working machine. This nitrogen gas supply system can continuously and effectively supply the nitrogen gas, even though the supplying amount thereof is small, to the tool tip of the machining part of the working machine after the nitrogen gas being separated and extracted from the from the atmosphere, thus the lower running costs therefor may be accomplished.

According to claims 5 and 6, with reference to claim 3 or 4, since the source of the air compressing means relies on the compressed air supply controlled at 0.4–0.8 Mpa (4–8 kg/cm$^2$) via piping running through the factory, it is not necessary to incorporate the air compressor in the nitrogen gas supply system. Thus the down-sized and low-cost nitrogen gas supply system can be accomplished. Further, the extraction of the nitrogen gas from the atmosphere also contributes to the remarkable reduction of running costs.

According to claims 7 and 8, with reference to claim 3 or 4, the air compressing means comprises the compressed air controlled at 0.4–0.8 Mpa (4–8 kg/cm via piping running through the factory, and the pressure intensifying means by which the compressed air is further intensified to be about 0.6–1.0 Mpa (6–10 kg/cm$^2$) therefore it is sufficient to incorporate a small size of air compressor in the nitrogen gas supply system. Thus the down-sized and low-cost nitrogen gas supply system can be accomplished, as well as the wider range of compressed air between 0.4–1.0 Mpa (4–10 kg/cm$^2$) may be obtained by using the compressed air running through the factory. Further, the extraction of the nitrogen gas from the atmosphere also contributes to the remarkable reduction of running costs.

According to claims 9 and 10, with reference to claim 3 or 4, since the air compressing means is the air compressor which directly compresses the atmosphere and generates the compressed air within the range of 0.2–1.0 Mpa (2–10 kg/cm$^2$), it is possible to obtain the wider range of compressed air between 0.2–1.0 Mpa (2–10 kg/cm$^2$) by single air compressing means. Further, the extraction of the nitrogen gas from the atmosphere also contributes to the remarkable reduction of running costs.

According to claims 11 and 12, the filter element serves to extract only the nitrogen gas ingredient from the compressed air, continuously and at low-cost.

According to claims 13 and 14, the absorption element serves to extract only the nitrogen gas ingredient from the compressed air, continuously and at low-cost.

According to claims 15 and 16, with reference to claims 1 and 2, after the supplied nitrogen gas is used at the machining part for the workpiece, this used nitrogen gas is recycled by the collecting means comprising the breathing device and by the transfer means for transferring the used and collected nitrogen gas to the air compressing means again. Thus it is possible to provide the nitrogen gas generator at lower running costs. Further, since the recycle of the nitrogen gas is carried out by a simplified collecting means, more effective extraction and recycle process can be accomplished.

According to claims 17 and 18, with reference to claim 15 or 16, the collecting means is provided with the breathing device and the filter. Accordingly, the impurities mingled in the used nitrogen gas are removed by the filter, and it is possible to recycle the collected nitrogen gas with high purity, thereby more effective extraction and recycle process can be accomplished.

According to claims 19 and 20, only the nitrogen gas ingredient is separated and extracted from the compressed air which has been obtained through compression of the atmosphere, and in regard to a working machine such as a machining center, a milling machine or a gear cutting machine, it is possible to continuously supply the extracted nitrogen gas by maintaining the high concentration thereof. Consequently, the continuous dry-cut operation by the above working machine as a dry-cut working machine can be carried out.

According to claim 21 and 22, only the nitrogen gas ingredient is separated and extracted from the compressed air which has been obtained through compression of the atmosphere, and in regard to a working machine such as a lathe in which a workpiece is rotated and a tool (bite) is fixed, it is possible to continuously supply the extracted nitrogen gas by maintaining the high concentration thereof. Consequently, the continuous dry-cut operation by the above working machine as a dry-cut working machine can be carried out.

And according to claims 23 and 24, only the nitrogen gas ingredient is separated and extracted from the compressed air which has been obtained through compression of the atmosphere, and in regard to a working machine such as a grinding machine in which a workpiece is ground by a grinding stone or tool, it is possible to continuously supply the extracted nitrogen gas by maintaining the high concentration thereof. Consequently, the continuous dry-cut operation by the above working machine as a dry-cut working machine can be carried out.

BRIEF DESCRIPTION OF THE DRAWINGS

The invention will be described below in detail with reference to the accompanying drawings, in which:

FIG. 7 is a table showing characteristics of the first through third types of nitrogen gas generator according to the present invention;

DETAILED DESCRIPTION OF THE INVENTION

Figure 1:
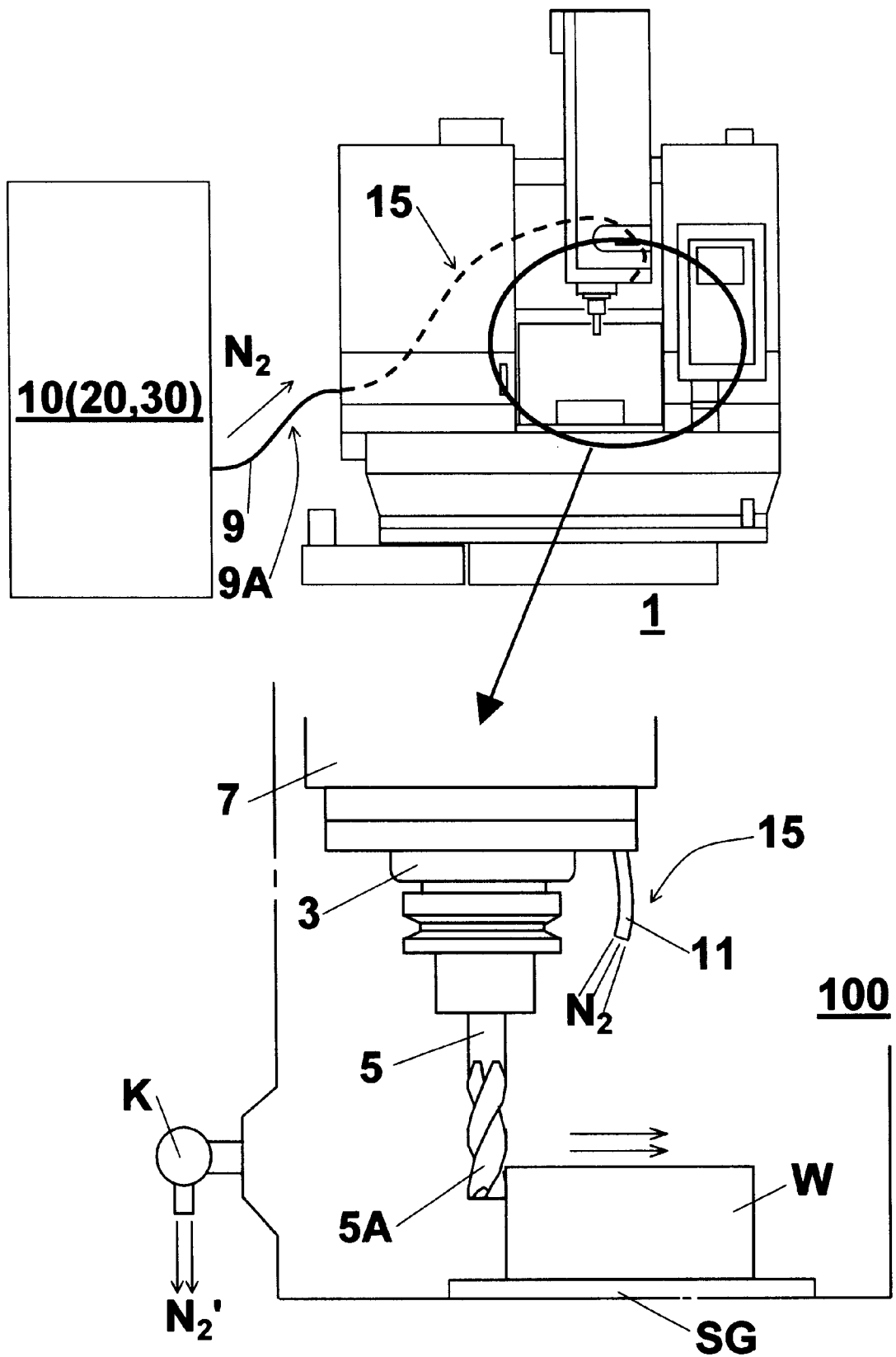
FIG. 1 is a front view of a working machine provided with a nitrogen gas supply system according to a first embodiment of the present invention.
Figure 2:
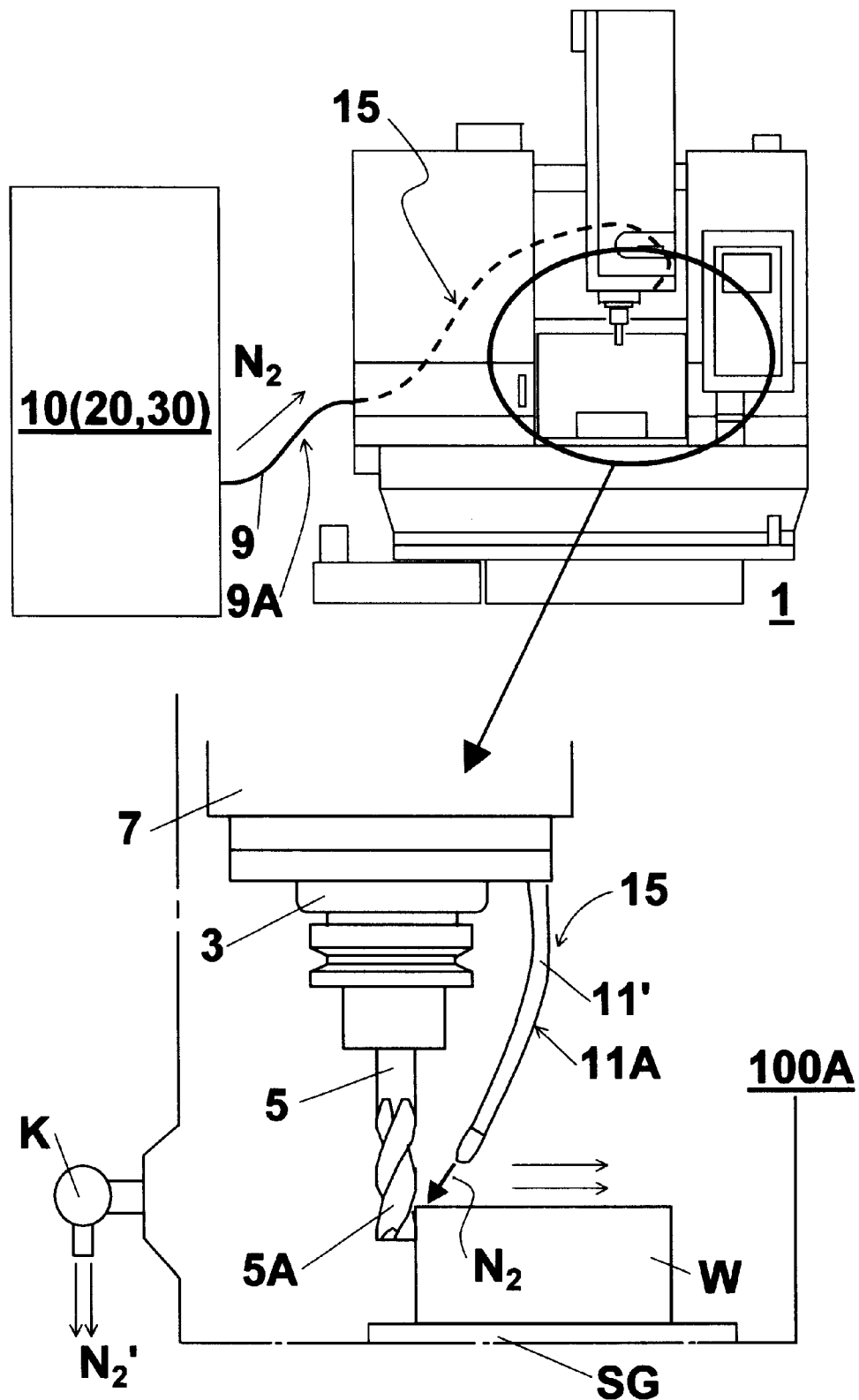
FIG. 2 is a front view of the working machine provided with the nitrogen gas supply system according to the first embodiment of the present invention.
Figure 3:
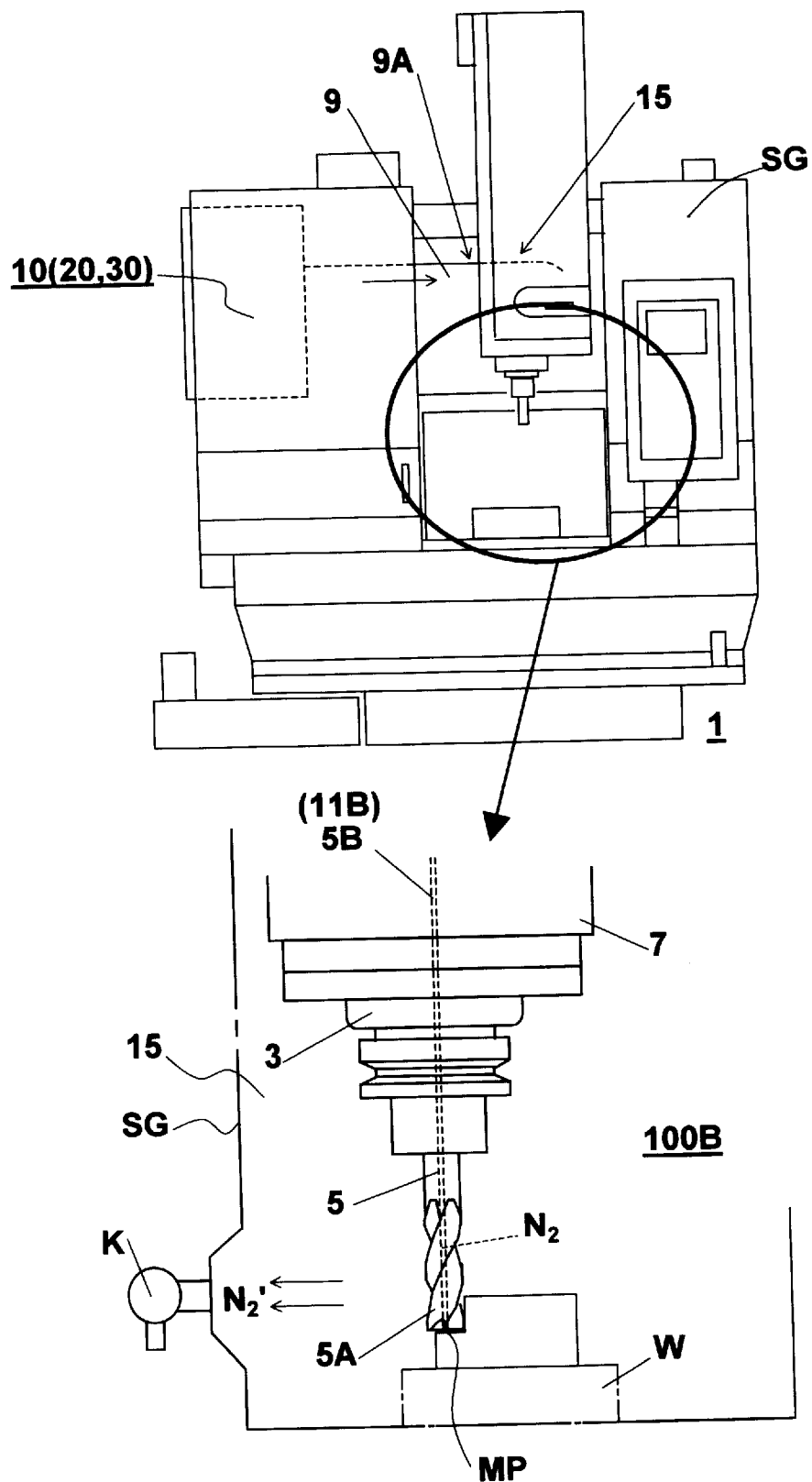
FIG. 3 is a front view of the working machine provided with the nitrogen gas supply system according to the first embodiment of the present invention.
Figure 4:
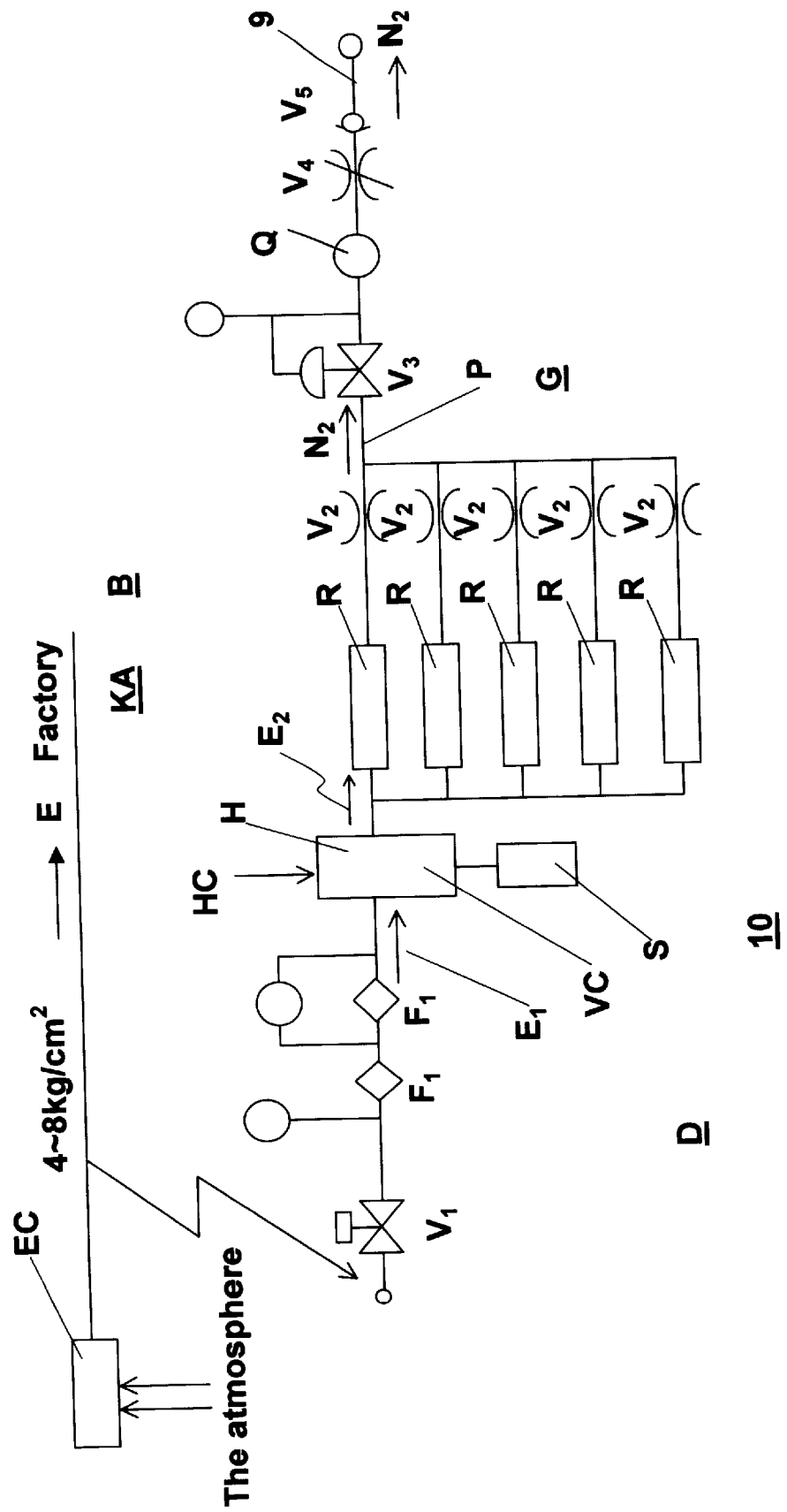
FIG. 4 is a block diagram of a first type of nitrogen gas generator according to the present invention.
Figure 8:
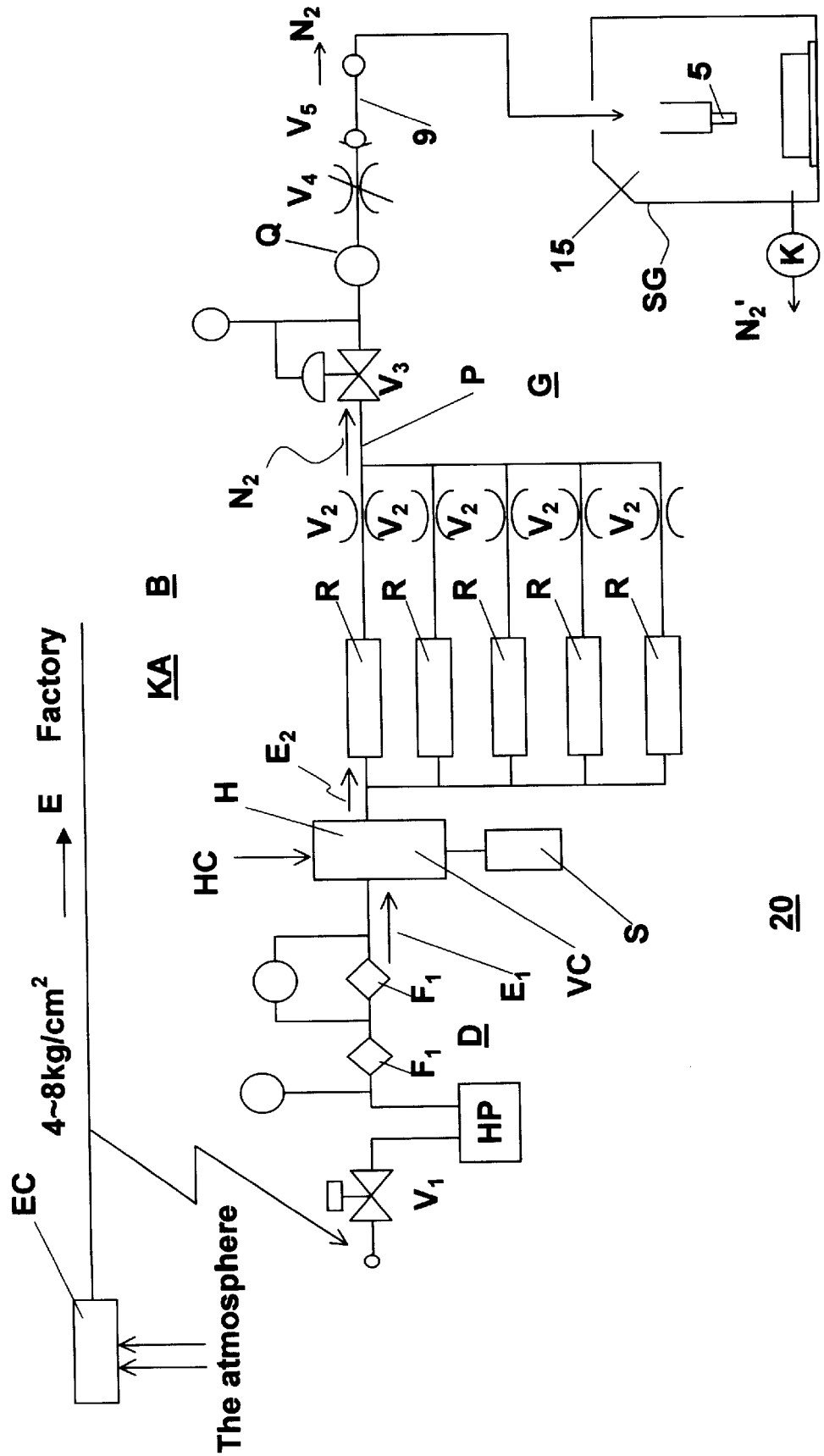
FIG. 8 is a block diagram of the second type of nitrogen gas generator according to the present invention.
Figure 9:
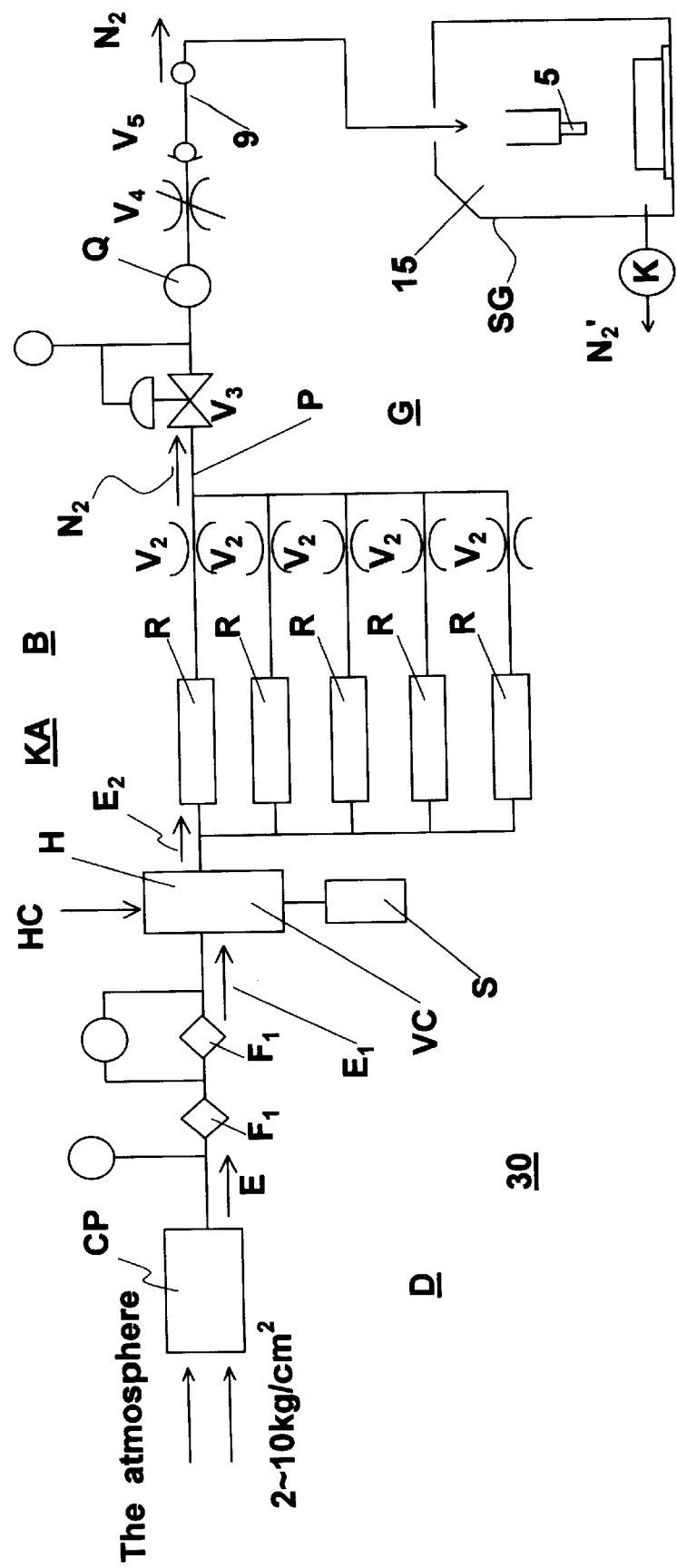
FIG. 9 is a block diagram of the third type of nitrogen gas generator according to the present invention.

A first embodiment of the present invention will now be described with reference to FIGS. 1 through 9. FIG. 1 is of the present invention. FIG. 1 is a front view of a nitrogen gas supply system 100 for dry-cut working machine, in which a nitrogen gas is supplied, from a blowoff tube 11, to a machining part 15, completely closed by a splash guard SG, of a working machine such as a machining center or a milling machine. FIG. 2 is a front view of a nitrogen gas supply system 100A for dry-cut working machine in which the nitrogen gas is blown, from a blowoff nozzle 11' positioned at a spindle, to a tool tip 5A. FIG. 3 is a front view of a nitrogen gas supply system 100B in which the nitrogen gas is blown from a center hole 5B penetrating through an axis of a tool. FIG. 4 is a circuit diagram of a nitrogen gas generator. FIG. 8 is a circuit diagram of a second type of nitrogen gas generator, and FIG. 9 is a circuit diagram of a third type of nitrogen gas generator. In the present invention, the term "dry-cut" as above mentioned means the cutting technology in which cutting is carried out by supplying the nitrogen gas to the machining part or the tool tip of the working machine.

The dry-cut working machine, of which reference numeral is 1, is provided with a high-speed rotation spindle 3, to which a tool 5 is attached. There is separately provided the blowoff tube 11 of which end opening aiming at the machining part 15 of the tool 5. The blowoff tube 11 may be provided, for example, on a spindle head 7 supporting the spindle 3. The blowoff tube 11 is connected to a nitrogen gas generator 10 which generates nitrogen gas $N_2$ via a piping 9. The piping 9 also serves as a supplier 9A. Accordingly, the supplier 9A supplies the nitrogen gas $N_2$ to the tool tip 5A of the tool 5 positioned in the space of the machining part 15. Since the machining part 15 is completely closed by the splash guard SG, the tool tip 5A as well as the surrounding machining part 15 are under the nitrogen gas atmosphere with no existence of oxygen, thereby the dry-cut operation can be carried out.

The blow temperature of the nitrogen gas $N_2$ is ordinarily a room (normal) temperature, and it is also possible to control the blow temperature between the room temperature and −150° C., so that the cutting may be carried out in a most appropriate temperature. The temperature control is carried out by a cooling device (not shown), by which the nitrogen gas $N_2$ of which temperature is controlled to be the most appropriate for application to a workpiece W placed on a machining table or to a tool 5, is supplied to the blowoff tube 11. The supply of the nitrogen gas $N_2$ to the blowoff tube 11 is controlled so that a most appropriate gas blow pressure for application to the workpiece W or the tool 5 may be obtained, within the range of 0.2–1.0 Mpa (2–10 kg/cm$^2$).

The spindle 3 of the working machine 1 is surrounded by a completely closed splash guard SG in order to prevent the nitrogen gas $N_2$ from being leaked out of the machining part. After completion of machining to the workpiece, the used nitrogen gas $N_2'$ is actively breathed by a breathing device K, then exhausted outside (into the atmosphere).

Now the nitrogen gas supply system 100A for dry-cut working machine as illustrated in FIG. 2 will be described. According to the nitrogen gas supply system 100A, there is also the dry-cut working machine 1 having the machining part 15, in which the high-speed rotation spindle 3, to which a tool tip 5A of the tool 5 is attached, is provided. There is separately provided the blowoff nozzle 11' aiming at the machining part 15. The blowoff nozzle 11' serves as a blower 11A. The blowoff nozzle 11' may be provided, for example, on a spindle head 7 supporting the spindle 3. The blowoff nozzle 11' is connected to the nitrogen gas generator 10 which generates the nitrogen gas $N_2$ via the piping 9, that is, the supplier 9A. Accordingly, the supplier 9A and the blower 11A supply the nitrogen gas $N_2$ to the tool tip 5A of the tool 5 positioned in the space of the machining part 15. Since the machining part 15 is completely closed by the splash guard SG, the tool tip 5A as well as the surrounding machining part 15 are under the nitrogen gas atmosphere with no existence of oxygen, thereby the dry-cut operation can be carried out.

The blow temperature and blow pressure of the nitrogen gas $N_2$, and the structure of the completely closed splash guard SG and the means for collecting the used nitrogen gas $N_2'$ are basically the same as the case of the nitrogen gas supply system 100 as above discussed. Therefore the detailed explanation thereof will not be made.

Now the nitrogen gas supply system 100B for dry-cut working machine as illustrated in FIG. 3 will be described. According to the nitrogen gas supply system 100B, the dry-cut working machine 1, having the machining part 15, is provided with the high-speed rotation spindle head 7 which supports the spindle 3, and the tool 5 is attached to this spindle 3. There is a center hole 5B serving as a blower 11B, penetrating through the spindle 3 as well as the tool 5 in the axial direction of the spindle 3. The upper end of the center hole 5B goes beyond the rear part of the spindle 3, and is connected to the nitrogen gas generator 10 serving as an external gas supply, via the supplier 9A. The lower end (bottom) of the center hole 5B reaches the outer surface of the tool tip 5A, so that an opening is formed on the outer surface of the cutting tip 5A. Thus the convergent and direct supply of the nitrogen gas $N_2$ at a machining point MP, at which a machining is applied to the workpiece W, can be carried out. Consequently, it is possible to supply the nitrogen gas $N_2$ inside of the workpiece W in the case of, for example, deep hole drilling, in which the nitrogen gas $N_2$ cannot be supplied by using the blowoff nozzle 11' according to the above discussed nitrogen gas supply system 100A. Accordingly, the most effective machining can be applied to the workpiece W regardless of the machining condition.

The blow temperature and blow pressure of the nitrogen gas $N_2$, and the structure of the completely closed splash guard SG and the means for collecting the used nitrogen gas $N_2'$ are also basically the same as the case of the nitrogen gas supply system 100 as above discussed. Therefore the detailed explanation thereof will not be made.

The structure and function of the nitrogen gas generator 10 used for the nitrogen gas supply system 100, 100A and 100b for dry-cut working machine, will now be described in detail with reference to FIG. 4 as for a first type thereof. According to the first type of the nitrogen gas generator 10, only the nitrogen gas ingredient $N_2$ is collected from the atmosphere (the air). This nitrogen gas generator 10 collects the atmosphere comprising 79% of nitrogen and 19% of oxygen around this generator, as the source of nitrogen gas. In this connection, for example, there is an air compressor EC which compresses the air to be about 0.4–0.8 Mpa (4–8 kg/cm$^2$), and the thus obtained compressed air E is supplied to every place or section in the factory via pipings running through the factory. This compressed air E has been serving as the compressed air supply actuating various air-actuated devices or instruments inside of the factory.

Figure 5:
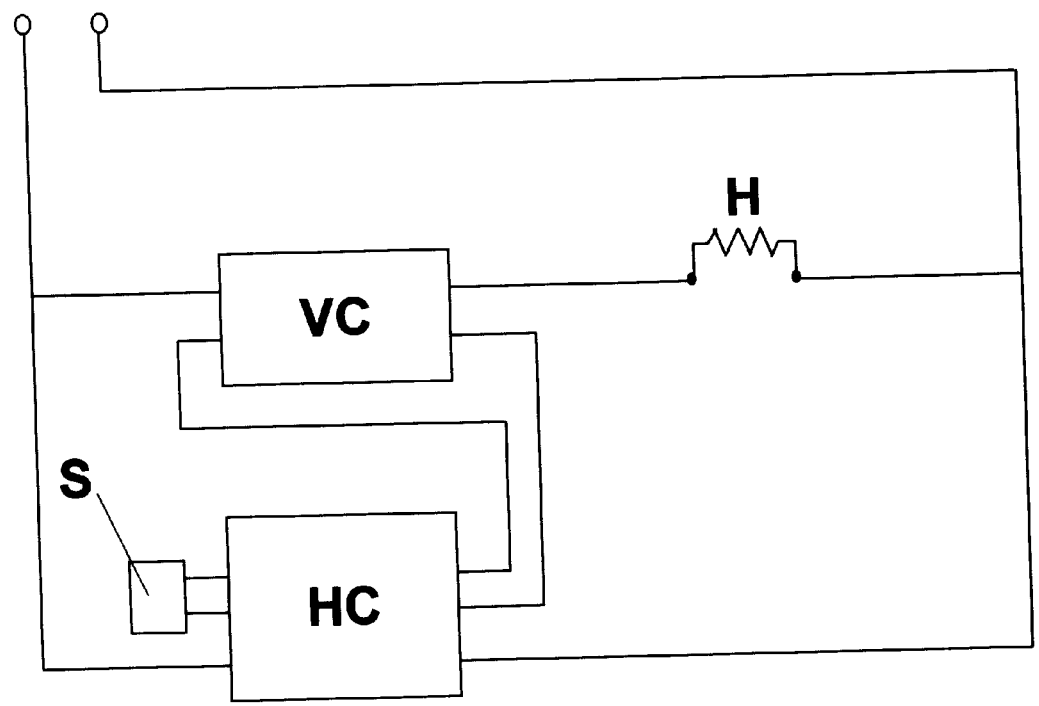
FIG. 5 is a circuit diagram of a heater of the first through third types of nitrogen gas generator according to the present invention.
Figure 6:
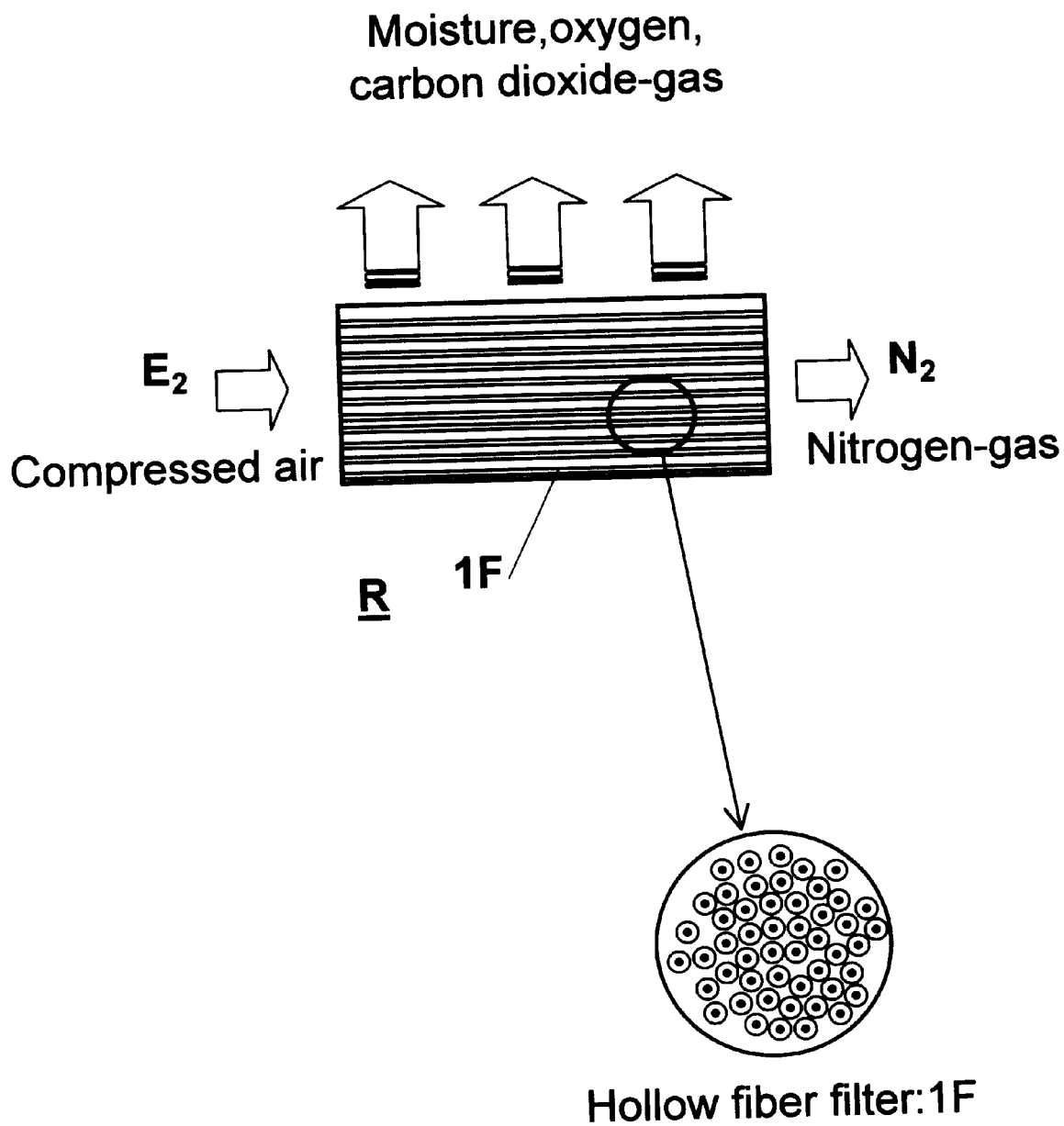
FIG. 6 is a structural diagram of a hollow fiber type of filter of the first through third types of nitrogen gas generator according to the present invention.

The compressed air E is connected via an open/shut valve V1 to a drying means D which purifies the compressed air by removing the impurities therefrom, such as oil, moisture and dust. The drying means D first generates a dry air E1 by using an air filter F1 (moisture removing elements comprising single stage—three stages) or an air dryer (so-called "freezing air dryer" by which the compressed air is cooled at −10° C., namely the dew point of water). The thus obtained dry air E1 is then heated by an electric heater H serving as a heating means KA, to be in temperature about 50–60° C., so that the efficient separation and extraction of the nitrogen gas $N_2$ may be carried out. While this heating process will be required in particular when the freezing air dryer is used, if the dry air E1 has been obtained by the air filter F1, such a heating process will not be required. In any case, the dry air E1 then becomes a dry air E2, of which temperature is about 50–60° C. The structure of the heating means KA is illustrated in FIG. 5. The electric heater H and a voltage controller VC are connected in series to an AC power supply (100V). A temperature detecting sensor S detects the temperature of the blown dry air E2, and a temperature detecting controller HC controls the voltage controller VC, thereby the voltage applied to the electric heater H is controlled in order to obtain the dry air E2 at temperature of 50–60° C.

The thus obtained dry air E2 is then pumped into an extracting means B in order to separate only the ingredient of nitrogen gas $N_2$. The extracting means B comprises a plurality of filter elements R connected in parallel. If a small amount of the nitrogen gas $N_2$ should be separated, it is sufficient to use one or two filter elements R. As illustrated in the expanded view of FIG. 6, each of the filter elements R is provided with a hollow fiber filter IF as the main component thereof. Since the hollow fiber filter IF serves as the film which separates the nitrogen gas from the other ingredients of the air, it is ordinarily called as a "separation film module". The permeating speeds in the hollow fiber filter IF are divided in two groups, that is, the faster speed group of "$H_2O, H_2, He, H_2S, CO_2, O_2$" and the slower speed group of "$Ar, Co, N_2, CH_4$". When the dry air E2 obtained from the compressed air E is pumped into this hollow fiber filter IF, the heavier and larger molecular sizes of moisture, oxygen and carbon dioxide gas cannot pass through the hollow fiber filter IF, and the lighter and smaller molecular size of nitrogen gas $N_2$ can only pass through such a filter. Thus, only the nitrogen gas $N_2$ can be collected and generated by this filter IF, and the rest, that is the moisture, oxygen and carbon dioxide gas, is discharged into the atmosphere.

Each of the filter elements R is provided with a throttle valve V2 at the output thereof in order to control the amount passing through the filter element R. Output pipings P of the filter elements R are concentrated as one piping P, with which a flow control valve V3 is connected. The thus obtained nitrogen gas $N_2$ then goes through a flow volume meter Q, a throttle valve V4 for the flow volume control, and an anti-reverse flow valve V5, etc., and eventually the nitrogen gas $N_2$ is supplied to the external piping 9. The number of plurality of filter elements R, as well as the connecting arrangements thereof, may be determined according to the using amount or the required gas concentration of the nitrogen gas $N_2$, without any limitations. The connecting arrangements of the filter elements R may be in parallel or in series, or even in their (multiple) combination (s). The gas concentration of the nitrogen gas $N_2$ is controlled to be at a predetermined value between 90% and 100%, by a gas concentration maintaining means G comprising the flow control valve V3 and the flow volume meter Q. When the flow amount of the gas decreases through this flow control valve V3, the gas concentration will increase. Consequently, the predetermined gas concentration can be maintained by maintaining the predetermined gas flow amount. The gas concentration maintaining means G may comprise the flow control valve V3 and an oxygen gas concentration meter. Although it is essentially preferable to measure the nitrogen gas concentration, since there exists no nitrogen gas concentration meter, the oxygen gas concentration meter will be used for indirectly measuring the concentration of the nitrogen gas from the rest value of the measured oxygen gas concentration.

The present invention may also adopt a second type of nitrogen gas generator 20 as illustrated in FIG. 8. The nitrogen gas generator 20 further comprises a pressure intensifying means HP in addition to the elements of the first type of nitrogen gas generator 10 as above discussed. This pressure intensifying means HP further intensifies the compressed air E at 0.4–0.8 Mpa (4–8 kg/cm$^2$) running through the factory after the atmosphere was compressed, to any appropriate pressure within the range of 0.6–0.8 Mpa (6–8 kg/cm$^2$). This pressure intensifying means HP is additionally provided at the position, for example, between the open/shut valve V1 and the moisture removing air filter F1. For the purpose of the pressure intensifying means HP, any small air compressor or pressure intensifier (cylinder) actuated by small electric power may utilized.

In regard to the intensified pressure in order to obtain the further compressed air E1, the compressed air E running through the factory, of which pressure is about 0.4–0.8 Mpa (4–8 kg/cm$^2$), is intensified to be about 0.6–1.2 Mpa (6–12 kg/cm$^2$). Therefore, as compared with the direct pressure intensification of the atmosphere to be about 0.6–1.2 Mpa (6–12 kg/cm$^2$) by using a large size of air compressor, since it is possible to intensify the pressure by only using the smaller size of air compressor or pressure intensifying cylinder, the space for installation, cost for equipment or the running costs may be reduced. In this connection, as the other elements of the second type of nitrogen gas generator 20 are the same as those of the first type of nitrogen gas generator 10, the same numerals are applied to such a generator 20, hence the explanation thereof will not be made.

The present invention may also adopt a third type of nitrogen gas generator 30 as illustrated in FIG. 9. In regard to this nitrogen gas generator 30, in place of the structure of the first type of nitrogen gas generator 10 in which the source of the nitrogen gas $N_2$ relies on the compressed air E at 0.4–0.8 Mpa (4–8 kg/cm$^2$) running through the factory after the atmosphere was compressed, there is provided a larger size of air compressor CP. Although this type of air compressor CP requires much costs, it is possible to directly obtain the compressed air in the range of 0.2–1.0 Mpa (2–10 kg/cm$^2$) from the atmosphere. When the large size of air compressor CP is used, in spite of its higher costs, the wider range of compressed air E may easily be obtained. After that, the compressed air E may be adjusted to be the required concentration of compressed air E, and may be pumped into the filter elements R. In this connection, as the other elements of the third type of nitrogen gas generator 30 are the same as those of the first type of nitrogen gas generator 10, the same numerals are applied to such a generator 30, hence the explanation thereof will not be made.

As above described, the structures of each of the nitrogen gas generators 10, 20 and 30, used for any of the nitrogen gas supply systems 100, 100A and 100B for dry-cut working machine are classified in three groups. Now the function of the extract of the nitrogen gas and the supply thereof to the working part 15 will be described as for each generator. First, in regard to the first type of nitrogen gas generator 10 as illustrated in FIG. 4, the atmosphere around the generator 10 (79% of nitrogen and 19% of oxygen) as the source of the nitrogen gas has been compressed to be within the range of 0.4–0.8 Mpa (4–8 kg/cm$^2$). The thus compressed air E is supplied to every place or section in the factory via pipings running through the factory, and is fundamentally used for any air-actuated instruments or apparatus. Therefore, the nitrogen gas generator 10 does not require any air compressor for generating the compressed air E, thus the running and installation costs may be reduced. Consequently, the compressed air E is supplied to the open/shut valve V1.

In regard to the second type of nitrogen gas generator 20 as illustrated in FIG. 8, the atmosphere around the generator 20 (79% of nitrogen and 19% of oxygen) as the source of the nitrogen gas has also been compressed to be within the range of 0.4–0.8 Mpa (4–8 kg/cm$^2$). The thus compressed air E is supplied to every place or section in the factory via pipings running through the factory, and is fundamentally used for any air-actuated instruments or apparatus. Then, where necessary, the pressure of the compressed air E (0.4–0.8 Mpa) is intensified by the pressure intensifying means HP to be about 0.6–1.0 Mpa. Therefore, it is sufficient to use the small size of air compressor to intensify the air pressure, thus the running and installation costs may be reduced. Consequently, the compressed air E is supplied to the open/shut valve V1.

In regard to the third type of nitrogen gas generator 30 as illustrated in FIG. 9, the large size of air compressor CP is used for directly intensify the pressure of the atmosphere in order to obtain the compressed air E within the range of 0.2–1.0 Mpa (2–10 kg/cm$^2$). Therefore such a large size of compressor should be prepared, but it is possible to easily obtain the wider range of compressed air. Consequently, the compressed air E is then be supplied to the open/shut valve V1.

As above described, in regard to the nitrogen gas generators 10, 20 and 30, the common process is used for separating and extracting the nitrogen gas $N_2$ from the compressed air E. Accordingly, the separation and extraction processes of the respective nitrogen gas generators 10, 20 and 30 will be described as the following common process.

The compressed air E is sent to the moisture removing air filter F1 (single—three stages) in order to obtain the dry air E1 in which the impurities such as oil, moisture and dust are removed. The dry air E1 is then heated by the electric heater H to be in temperature about 50–60° C. In regard to the electric heater H, as illustrated in FIG. 4, the temperature detecting sensor S detects the temperature of the obtained dry air E2, and the temperature detecting controller HC controls the voltage controller VC to be at the voltage so that the temperature of the dry air E2 may be at temperature of 50–60° C.

The thus heated dry air E2 is then pumped into the extracting means B comprising a plurality of filter elements R in order to separate only the ingredient of nitrogen gas $N_2$ from the dry air E2. When the dry air E2 passes through the filter elements R, the heavier and larger molecular sizes of moisture, oxygen and carbon dioxide gas cannot pass through the hollow fiber filter IF, and the lighter and smaller molecular size of nitrogen gas $N_2$ can only pass through such a filter IF. Thus, only the nitrogen gas $N_2$ can be collected and generated by this filter IF, and the rest, that is the moisture, oxygen and carbon dioxide gas, is discharged into the atmosphere.

The extracted nitrogen gas $N_2$ from each of the outputs of the filter elements R via the throttle valve V2 is concentrated at one piping P. The concentration of the generated nitrogen gas $N_2$ is then controlled to be at a predetermined value between 90% and 100% by the flow control valve V3. That is, when the flow amount of the gas decreases through this flow control valve V3, the gas concentration will increase, and the flow amount thereof increases by opening the flow control valve V3, the gas concentration will decrease. The flow amount thereof is measured by the flow volume meter Q in order to obtain the predetermined gas concentration. As for the actual concentration of the nitrogen gas $N_2$, the flow amount of the piping P is measured by the flow volume meter Q, thereby the gas concentration will be presumed. The output of the flow volume meter Q is provided with the throttle valve V4 and the anti-reverse flow valve V5, from which the nitrogen gas $N_2$ is supplied, via the supplier 9A, to the blowoff nozzle 11' or the center hole 5A of the dry-cut working machine 1. For reference, if the oxygen gas concentration meter is used, the nitrogen gas concentration is indirectly measured from the rest value of the measured oxygen gas concentration.

The characteristics of the above discussed three types of the nitrogen gas generator 10, 20 and 30 are shown in the table of FIG. 7. According to this table, it is proved that 15 Nm$^3$/h of nitrogen gas $N_2$ per hour can be generated by maintaining the nitrogen gas concentration of 95%. In order to secure this condition, source air pressure: 3.0 kg/cm$^2$, source air temperature: room temperature, and nitrogen gas pressure: 4.0 kg/cm$^2$ are required. Further, nitrogen gas dew point: –30° C., source air dew point: –10° C., and flow meter range: 20.0 Nm$^3$/h, are used.

According to the three types of the nitrogen gas generator 10, 20 and 30 as above described, the compressed air at 0.4–1.0 Mpa (4–10 kg/cm$^2$) or at 0.2–1.0Mpa (2–10 kg/cm$^2$) obtained by compressing the atmosphere is supplied to the filter elements of the extracting means B, thereby only the nitrogen gas ingredient may be separated and extracted. Thus the extracted nitrogen gas, of which gas concentration is maintained at the predetermined value between 90%–100%, may be supplied to the dry-cut working machine 1. Accordingly, as illustrated in FIGS. 1, 2 and 3, the nitrogen gas $N_2$ may continuously be supplied to the working part 15 via the blowoff tube 11, the blowoff nozzle 11' or the center hole 5B. Since the tool tip 5A of the tool 5 and the adjacent area thereto in which the machining to the workpiece W is carried out is in the no-oxygen, nitrogen gas atmosphere, the cooling effect and the prevention of oxidation may be accomplished.

The above discussed three types of the nitrogen gas generators 10, 20 and 30 have the following merits. First, the nitrogen gas existing in the atmosphere may be extracted as the large amount of nitrogen gas at the predetermined concentration within a range of 90%–100% by the filter elements R of the extracting means B and the gas concentration maintaining means G. Accordingly, the constant supply of the nitrogen gas can be carried out, which contributes to the reduction of the running costs and the continuous supply of the nitrogen gas to the machining part for the workpiece W.

Further, in regard to the first and second types of the nitrogen gas generators 10 and 20, the compressed air E running through the factory at 0.4–0.8 Mpa (4–8 kg/cm$^2$) is used as the source of the compressed air E1. Thus it is not necessary to incorporate the air compressor in the nitrogen gas generator. In addition, if the further compression of the air is required, it is sufficient to use the small size of pressure intensifying means HP to obtain the compressed air at 0.6–1.0Mpa (6–10 kg/cm$^2$). Accordingly, the down-sized and low-cost nitrogen gas supply system can be accomplished. Further, according to the third type of the nitrogen gas generator 30, the wider range of compressed air may be obtained by the air compressor CP, thus the nitrogen gas having the wider range of flow amount and concentration can be supplied.

The nitrogen gas generator 10, 20 and 30 can be applied to the nitrogen gas supply system 100, 100A and 100B, as respectively illustrated in FIGS. 1, 2 and 3, each of which is connected to the dry-cut working machine 1. Now the function of the dry-cut working machine 1 will be described. First, the generation of the nitrogen gas $N_2$ is carried out by one of the nitrogen gas generators 10, 20 and 30 as respectively shown in FIGS. 4, 8 and 9. The obtained concentration of the nitrogen gas $N_2$ is controlled within a range of 90%–100% according to the condition of working. As for the actual concentration of the nitrogen gas $N_2$, the flow amount of the piping P is measured by the flow volume meter Q, thereby the gas concentration will be presumed. The output of the flow volume meter Q is provided with the throttle valve V4 and the anti-reverse flow valve V5, from which the nitrogen gas $N_2$ is supplied via the supplier 9A to the blowoff tube 11 of the dry-cut working machine 1. In regard to the working machine shown in FIG. 2, the nitrogen gas $N_2$ is supplied to the blowoff nozzle 11' serving as the blower 11A. The blow pressure of the nitrogen gas $N_2$ is controlled to be the most appropriate pressure for the workpiece W or the tool used for working within a range of 0.2–1.0Mpa (2–10 kg/cm$^2$).

Accordingly, in regard to the dry-cut working machine 1 shown in FIG. 1 or 2, there has been the compressed air E obtained by compressing the atmosphere, and only the nitrogen gas ingredient is separated and extracted from such a compressed air E. The thus extracted nitrogen gas $N_2$, of which concentration is maintained to be a predetermined and considerably high concentration (90%–100%), is then supplied to the working part 15 or the tool tip 5A. The working part 15 and the tool tip 5A thus become in the nitrogen gas atmosphere with no oxygen existing, thereby the cooling function and the oxidation prevention for the tool 5 as well as the workpiece W can effectively be accomplished. Further, since the nitrogen gas existing in the atmosphere is collected and supplied, the lower running costs and continuous nitrogen gas supply can also be accomplished.

The above function can also be accomplished according to the dry-cut working machine 1 as illustrated in FIG. 3. In regard to this working machine 1 of FIG. 3, there is provided the high-speed rotation spindle head 7 which supports the spindle 3, and the tool 5 is attached to this spindle 3. There is the center hole 5B penetrating through the spindle 3 as well as the tool 5. The upper end of the center hole 5B goes beyond the rear part of the spindle 3, and is connected to one of the nitrogen gas generators 10, 20 and 30 serving as an external gas supply. The lower end (bottom) of the center hole 5B reaches the outer surface of the tool tip 5A, so that the opening is formed on the outer surface of the cutting tip 5A. Thus the convergent and direct supply of the nitrogen gas $N_2$ at the machining point MP, at which the machining is applied to the workpiece W, can be carried out. Consequently, it is possible to supply the nitrogen gas $N_2$ inside of the workpiece W in the case of, for example, deep hole drilling, in which the nitrogen gas $N_2$ cannot be supplied by using the blowoff nozzle 11'. Accordingly, the most effective machining can be applied to the workpiece W regardless of the machining condition.

According to the nitrogen gas supply systems 100, 100A and 100B for dry-cut working machine 1, as respectively illustrated in FIGS. 1 through 3, the common function can be obtained as follows. That is, there has been the compressed air running through the factory at 0.4–0.8 Mpa (4–8 kg/cm$^2$) obtained by compressing the atmosphere, and this compressed air is first supplied to the filter elements in order to separate and extract only the nitrogen gas ingredient. The thus extracted nitrogen gas $N_2$ is maintained at the concentration not less than 90%, and can be supplied to the working part of the tool tip of the working machine. The working part for the workpiece or the tool tip thus becomes in the nitrogen gas atmosphere with no oxygen existing, thereby the cooling function and the oxidation prevention for the tool as well as the workpiece can effectively be accomplished. Further, since the nitrogen gas existing in the atmosphere is collected and supplied, the lower running costs and continuous nitrogen gas supply can also be accomplished.

The air compressing means may comprise only the compressed air at 0.4–0.8 Mpa (4–8 kg/cm$^2$) running through the factory via piping, or the additional pressure intensifying means which intensifies the compressed air in the factory to be about 6–10 kg/cm$^2$. Accordingly, it is not necessary to incorporate a large size of air compressor in the nitrogen gas generator, and instead, the small size of air compressor may be incorporated in order to sufficiently intensify the air pressure. Thus the down-sized and low-cost nitrogen gas generator accepting wider range of compressed air can be accomplished.

Further, the air compressing means may also comprise the special air compressor which generates the wider range of compressed air at 0.2–1.0Mpa (2–10 kg/cm$^2$) directly from the atmosphere. Thus the wider range of compressed air at 0.2–1.0 Mpa (2–10 kg/cm$^2$) may be obtained.

Figure 10:
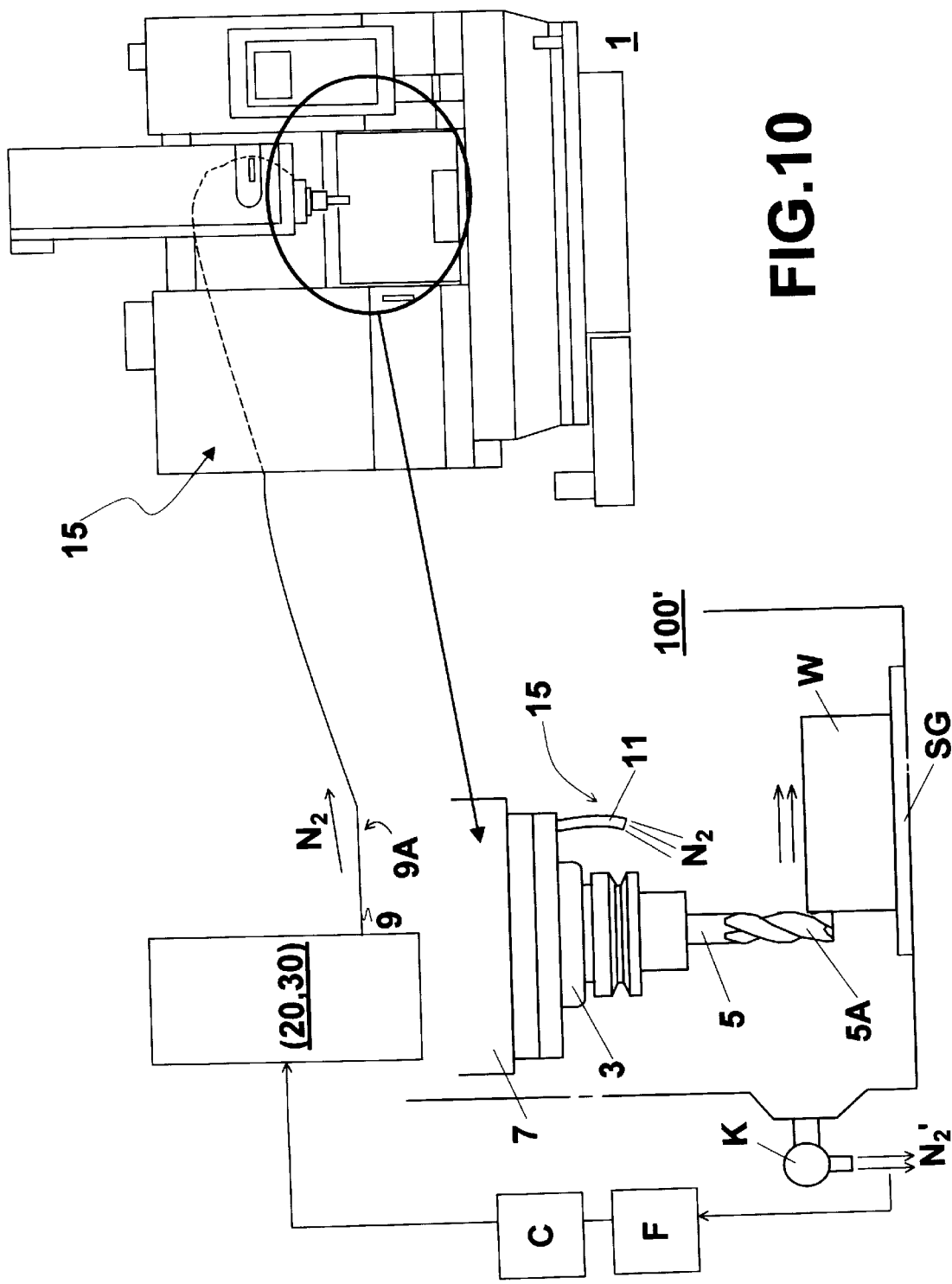
FIG. 10 is a view showing overall structure of a nitrogen gas supply system to which a recycle function is added according to a second embodiment of the present invention.
Figure 11:
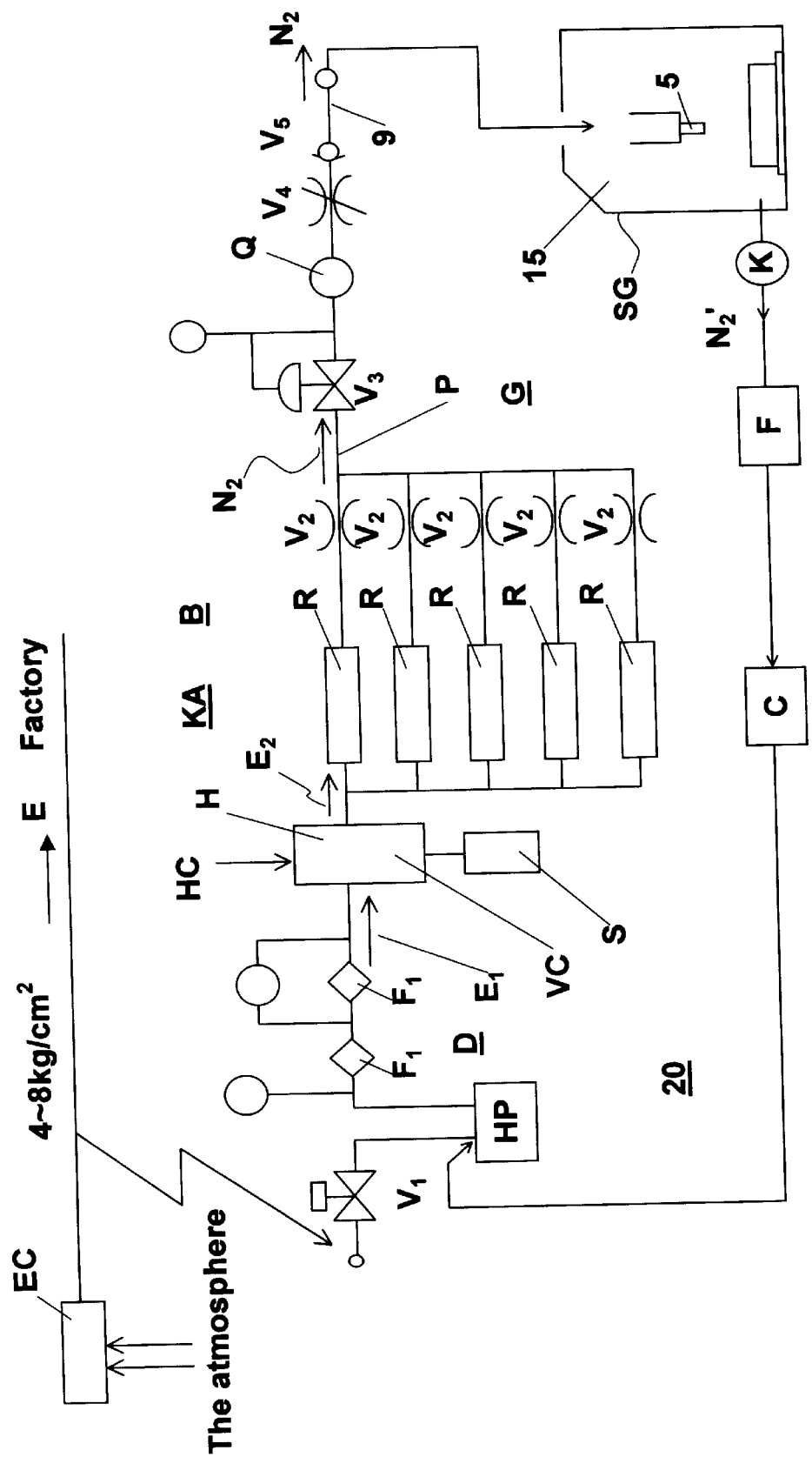
FIG. 11 is a block diagram of the second type of nitrogen gas generator to which the recycle function is added.
Figure 12:
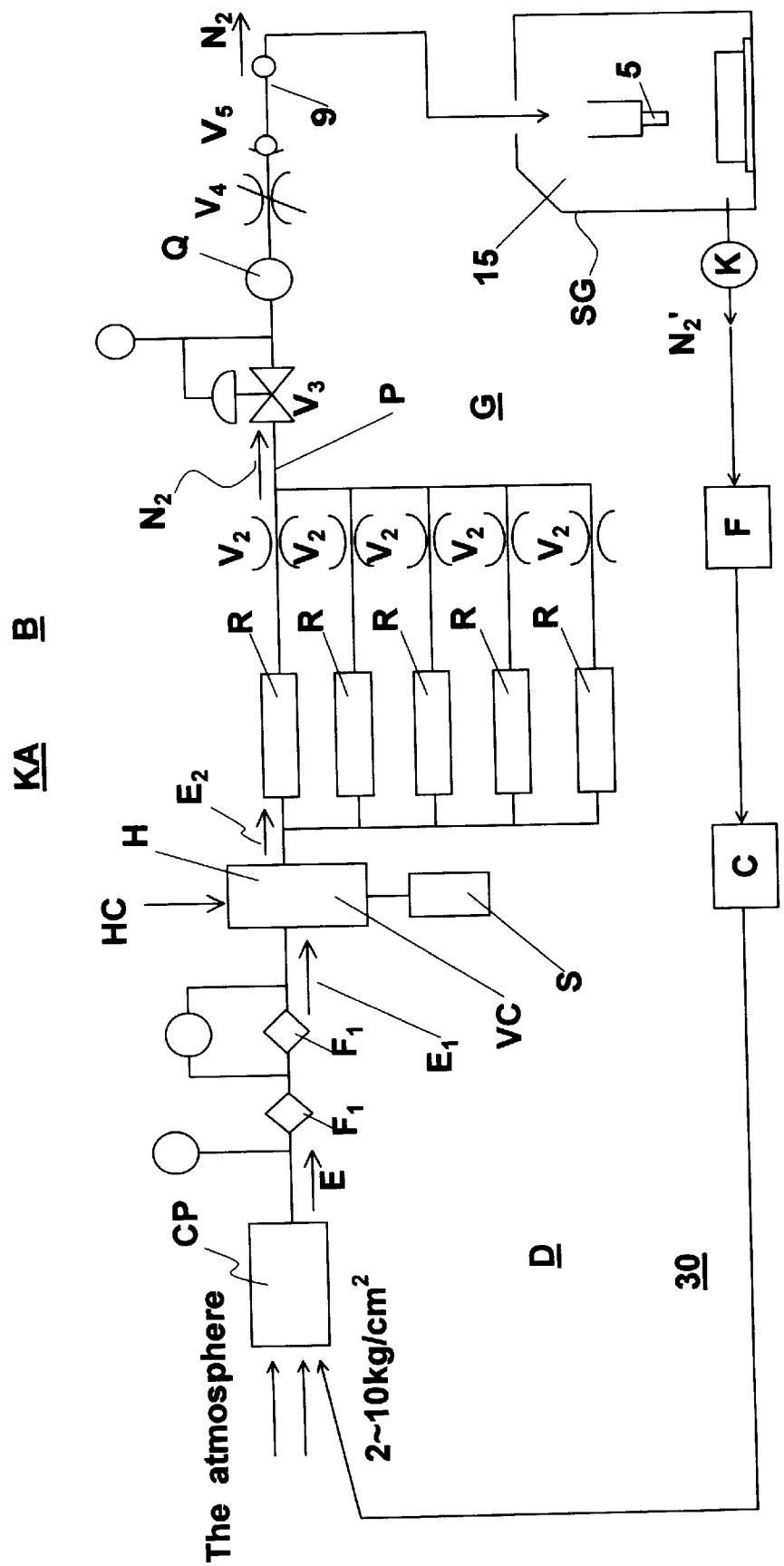
FIG. 12 is a block diagram of the third type of nitrogen gas generator to which the recycle function is added.

As above discussed, the nitrogen gas supply systems 100, 100A and 100B for dry-cut working machine respectively comprise the nitrogen gas generator 10, 20 and 30. Further, any of the nitrogen gas supply systems 100, 100A and 100B may be modified to a nitrogen gas supply system 100' as illustrated in FIG. 10 according to a second embodiment of the present invention. In the second embodiment, a used nitrogen gas $N_2'$ is collected by a breathing device K (to which a blower, air pump, etc. may be applied) and a filter F serving as a collecting means, then a transfer means comprising a piping P2 sends the used nitrogen gas $N_2'$ having raised in temperature, via a cooler C which cools such a used nitrogen gas $N_2'$, to an air intake of the air compressor HP, CP of the nitrogen gas generator 20, 30. Accordingly, the used nitrogen gas $N_2'$ can be reused. The cooler C may be omitted if the temperature of the used nitrogen gas $N_2'$ is not considerably high. Further, according to the type of material to which the machining is carried out, the filter F may also be omitted if such a machining causes little dust. As illustrated in FIGS. 11 and 12, the recycle of nitrogen gas according to the second embodiment may be applied to the nitrogen gas generators 20 and 30 respectively provided with the pressure intensifying means HP and the air compressor CP. As the other elements and functions of FIGS. 11 and 12 are basically the same as those of FIGS. 8 and 9, the explanation thereof will not be made.

According to the nitrogen gas supply system 100' for dry-cut working machine in the second embodiment as illustrated in FIG. 10, the space around the spindle 3 of the dry-cut working machine 1 is completely closed by the splash guard SG in order to prevent the nitrogen gas $N_2$, which has been blown to the working part 15, from being leaked to the outside of the splash guard SG, thereby the high concentration of the nitrogen gas is maintained. After the working is completed, the used nitrogen gas $N_2'$ is actively taken in and collected by the breathing device K. Then the impurities of the thus collected used nitrogen gas $N_2'$ are removed by the filter F, thus the used nitrogen gas $N_2'$ having high concentration is recycled and sent to the nitrogen gas generator 20 or 30. Accordingly, more effective extraction and recycle of the nitrogen gas can be carried out. It is of course clear that the recycle of nitrogen gas according to the second embodiment may also be applied to the nitrogen gas supply systems 100A and 100B for dry-cut working machine as shown in FIGS. 2 and 3.

Figure 13:
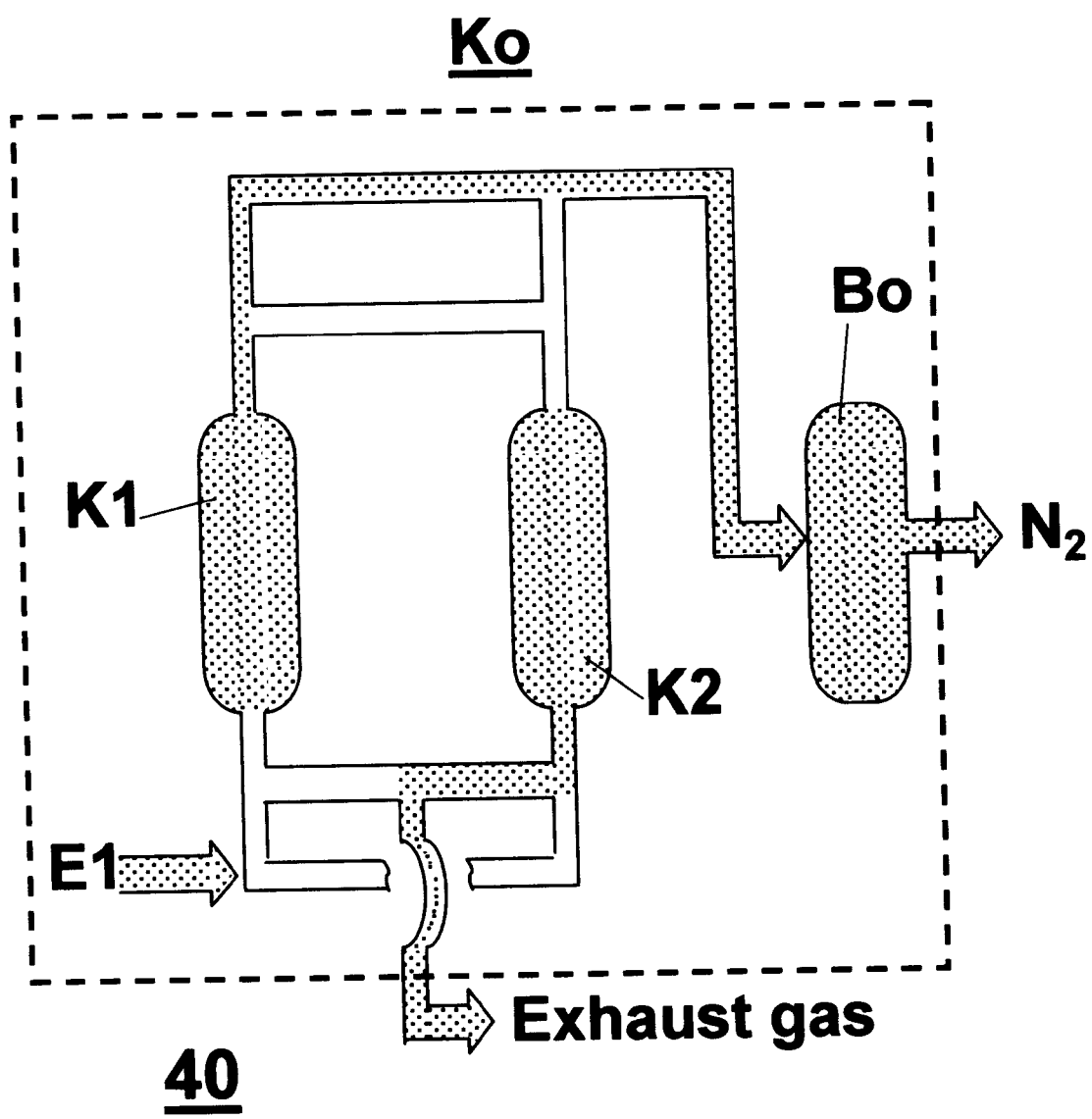
FIG. 13 is a block diagram of a fourth type of nitrogen gas generator according to the present invention.

As for the nitrogen gas supply systems 100, 100A and 100B for dry-cut working machine according to the present invention, the application of the nitrogen gas generator thereto is not limited to the above discussed three types of nitrogen gas generators 10, 20 and 30 as illustrated in FIGS. 3 through 9. For example, there is provided a fourth type of nitrogen gas generator 40 as illustrated in FIG. 13, in which an absorption element Ko is used as the extracting means B. This type of nitrogen gas generator 40 has been provided as a multi-purpose nitrogen gas generator. The nitrogen gas generator 40 is provided with two absorption tanks K1 and K2, to each of which the compressed air E1 is alternately sent in order to generate the nitrogen gas $N_2$ having high concentration. The compressed air E1 has been generated and running through the factory, or is generated by the air compressor to be at 0.2–1.0 Mpa (2–10 kg/cm$^2$).

Figure 14:
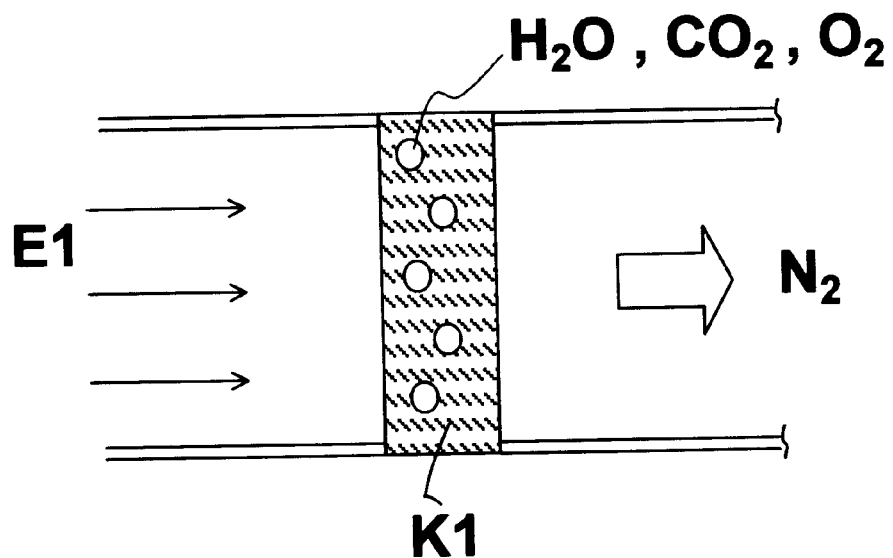
FIG. 14 is a sectional view showing function of the fourth type of nitrogen gas generator according to the present invention.
Figure 15:
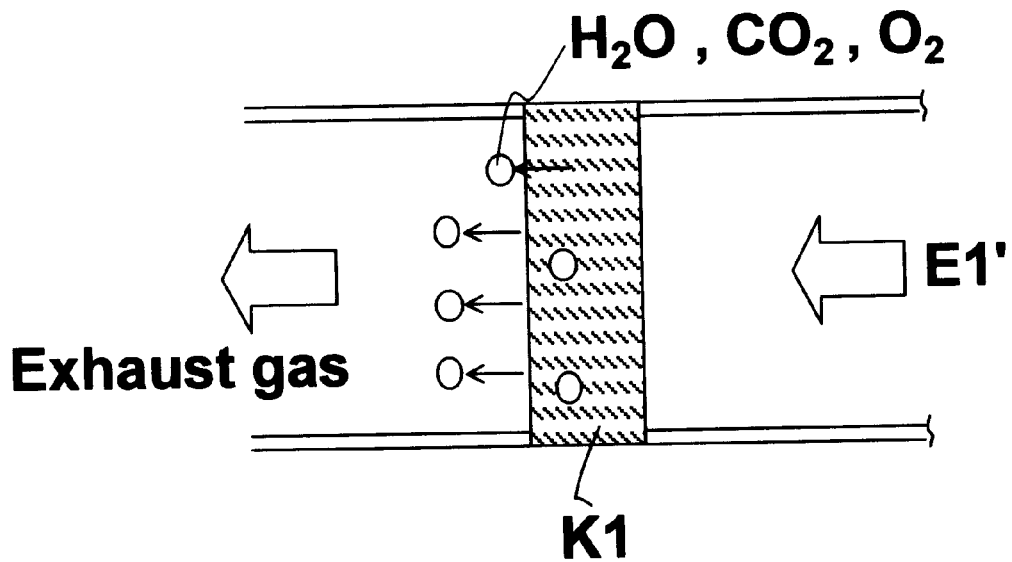
FIG. 15 is a sectional view showing function of the fourth type of nitrogen gas generator according to the present invention.

As illustrated in FIG. 14, when the compressed air E1 is inducted into the absorption element Ko, the absorption tank K1 absorbs $H_2O$, $CO_2$, $O_2$, etc., and only the nitrogen gas $N_2$ passes through this absorption tank K1. The nitrogen gas N is then sent to a buffer tank Bo. As the function of the absorption tank K1 may have been paralyzed due to absorbing impurities such as $H_2O$, $CO_2$, $O_2$, etc., the induction of the compressed air E1 will be interrupted in such a paralyzed state of the absorption tank K1, and the compressed air E1 is then inducted from the opposite side as illustrated in FIG. 15. The thus inducted compressed air E1' in the opposite direction serves to remove $H_2O$, $CO_2$, $O_2$, etc., which have been absorbed by the absorption tank K1, to the outside as an exhaust gas. After that, the compressed air E1 is inducted again from the left hand of FIG. 14, thus $H_2O$, $CO_2$, $O_2$, etc. are absorbed by the absorption tank K1, and only the nitrogen gas $N_2$ passed through the absorption tank K1 is repeatedly sent to the buffer tank Bo.

When the absorption tank K1 absorbs the compressed air E1, this compressed air E1 also serves as the compressed air E1' in the opposite direction as for the other absorption tank K2. That is, since the absorption tanks K1 and K2 are alternately operated by the phase-shift of 180°, when the compressed air E1 is inducted in the absorption tank K1, this compressed air exhausts $H_2O$, $CO_2$, $O_2$, etc. which have been absorbed by the absorption tank K2 to the outside as the compressed air E1' in the opposite direction. Consequently, the nitrogen gas $N_2$ may continuously be supplied to the buffer tank Bo. If the nitrogen gas generator 40 consumes a large amount of nitrogen gas, it is sufficient to increase the size or the number of the absorption tanks K1 and K2.

Figure 16:
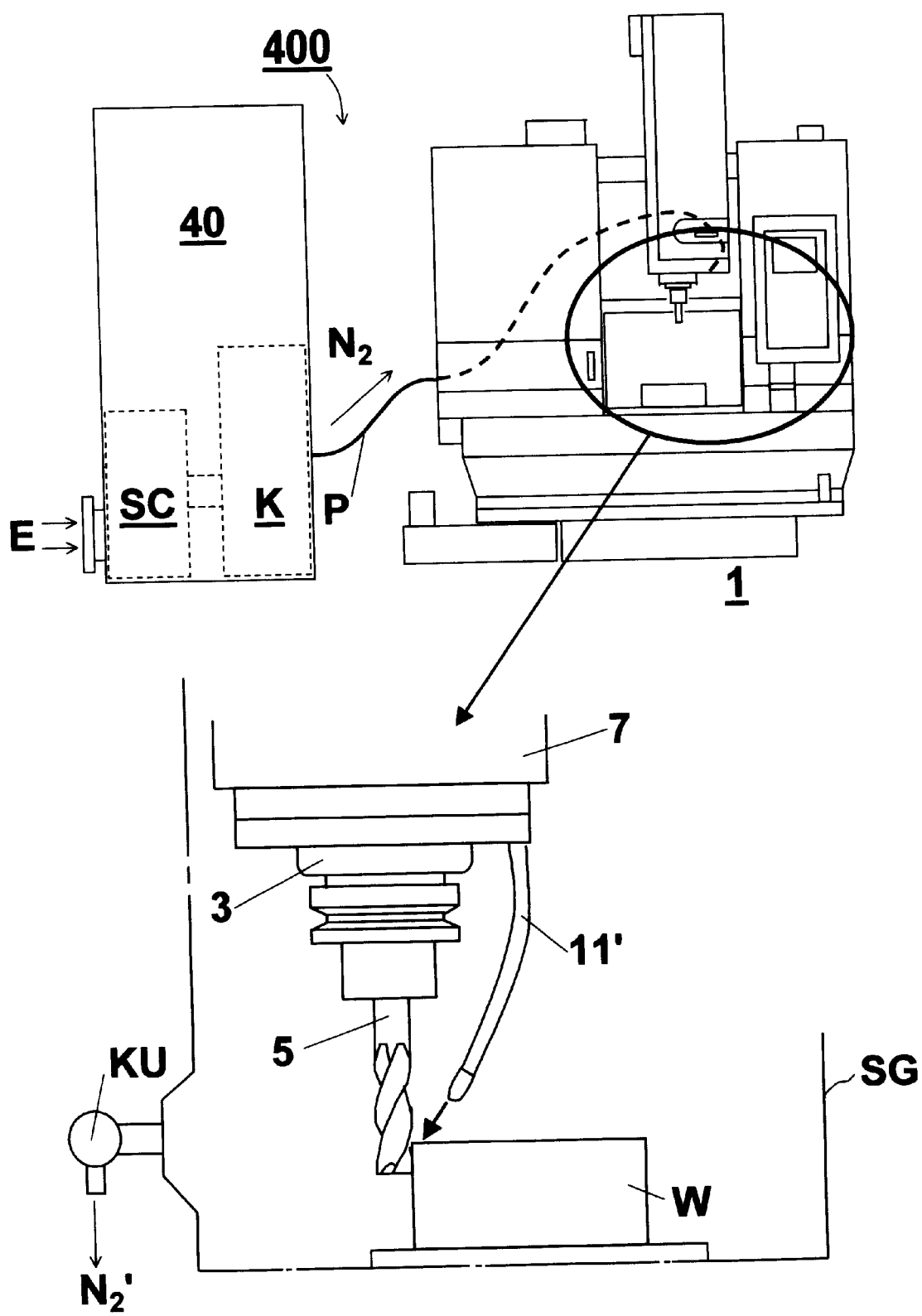
FIG. 16 is a front view of a working machine provided with a nitrogen gas supply system according to a third embodiment of the present invention.

The thus generated nitrogen gas $N_2$ by the nitrogen gas generator 40 is collected in the buffer tank Bo. The nitrogen gas $N_2$ in this buffer tank Bo is then supplied, by a nitrogen gas supply system 400 for dry-cut working machine according to a third embodiment of the present invention as illustrated in FIG. 16, to the blowoff nozzle 11' (or the blowoff tube 11 of FIG. 1 or the center hole 5B of FIG. 3) via the piping P serving as the supplier. In the third embodiment, the function thereof is basically the same as those of the nitrogen gas supply systems 100, 100A and 100B for dry-cut working machine using any of the first through third types of the nitrogen gas generators 10, 20 and 30. Therefore the detailed explanation of the function will not be made.

The nitrogen gas supply system 400 according to the third embodiment to which the nitrogen gas generator 40 is applied has the following merits. First, the compressed air running through the factory is supplied to the absorption element, thereby the nitrogen gas may be separated and extracted at lower running costs. Then this low-cost nitrogen gas can be supplied to the tool tip of the working machine which carries out the machining for the workpiece, thus the dry-cut working for the workpiece can be carried out in the nitrogen gas atmosphere with no oxygen existing.

In regard to the absorption element, when the flow amount of the nitrogen gas increases, the nitrogen gas concentration will not significantly be lowered. Therefore, according to this merit of the absorption element, the nitrogen gas supply system 400 is suitable for a large amount of nitrogen gas supply.

Figure 17:
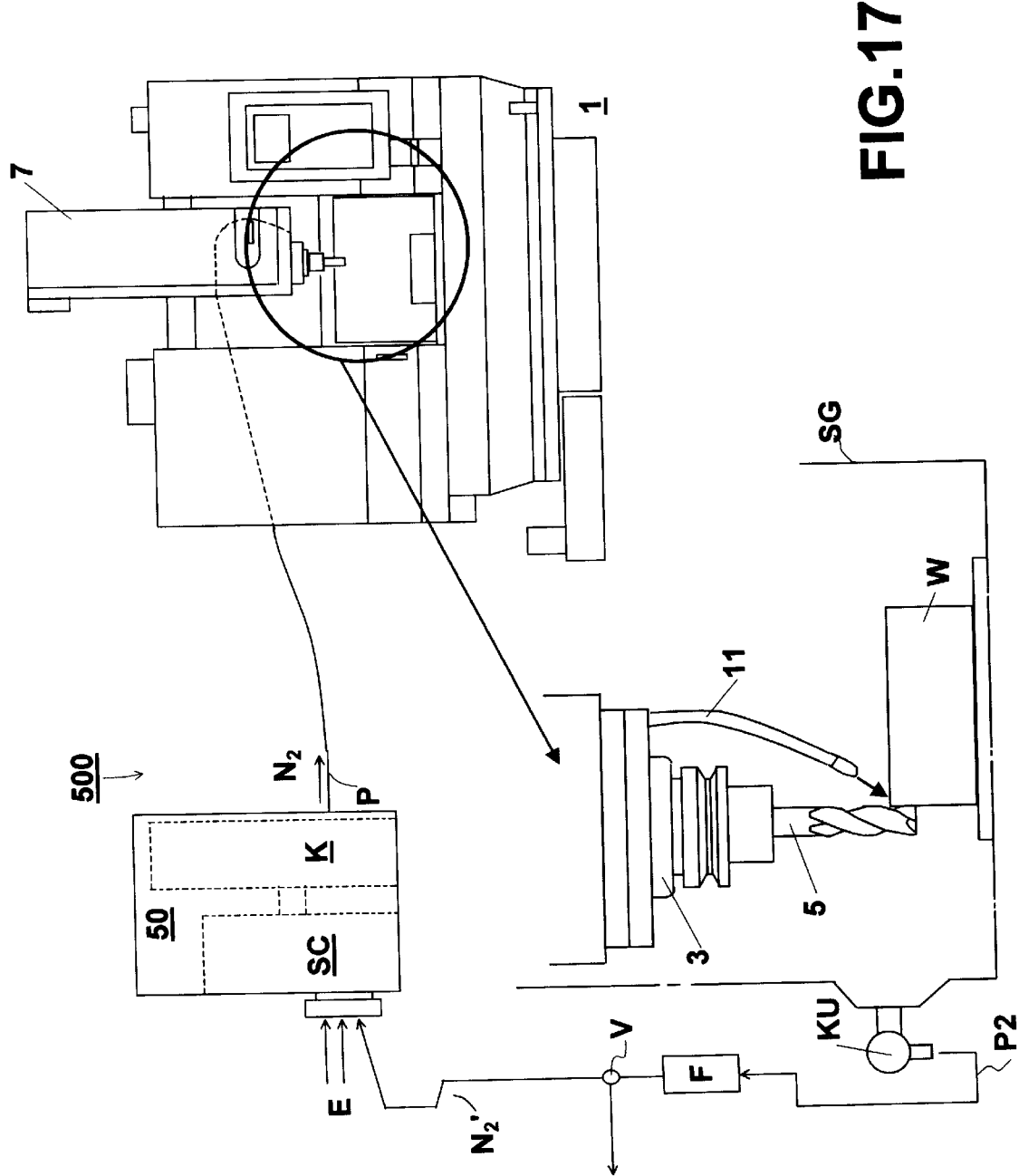
FIG. 17 is a front view of a working machine provided with a nitrogen gas supply system to which the recycle function is added according to a fourth embodiment of the present invention.
Figure 18:
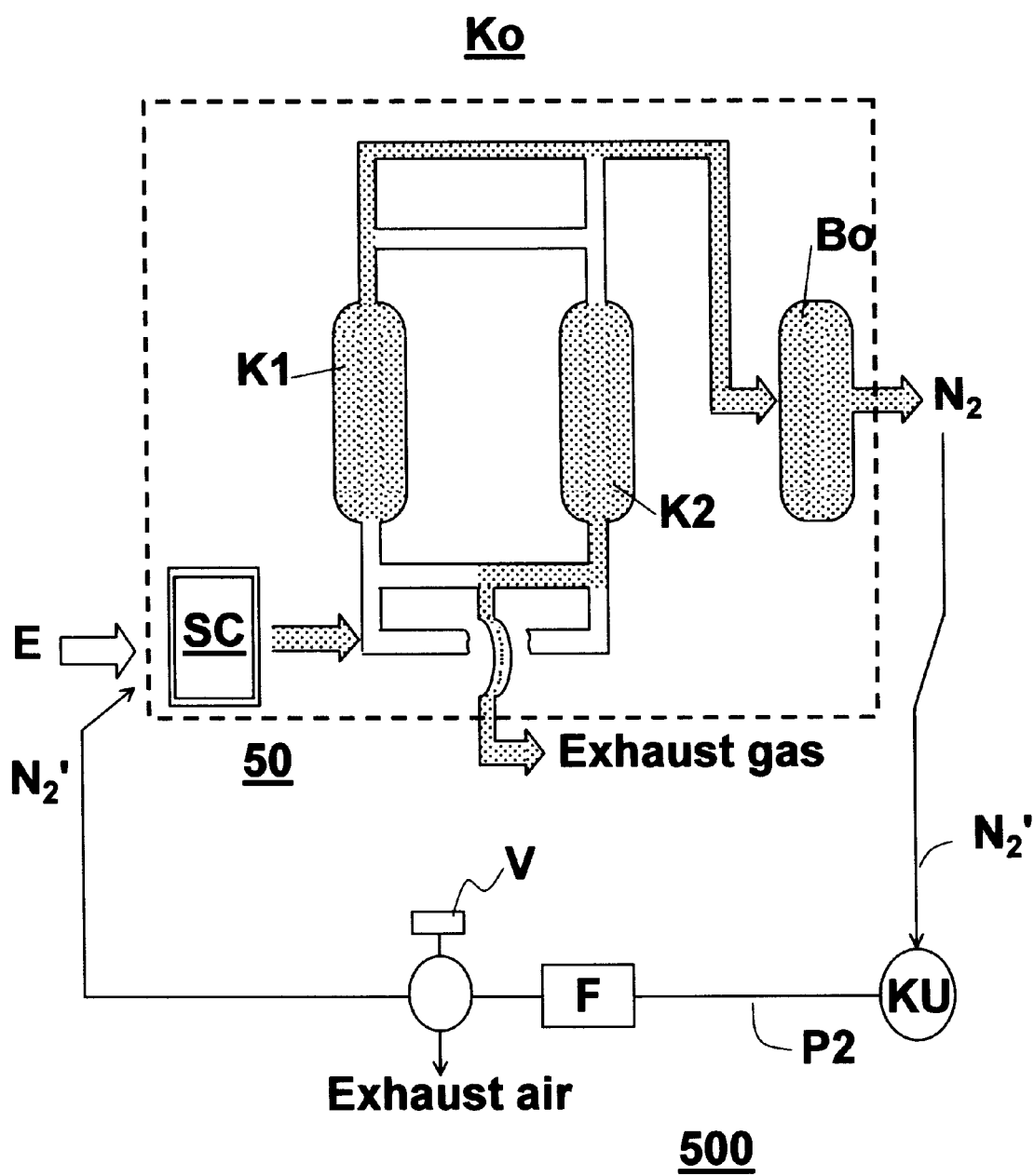
FIG. 18 is a block diagram showing function of a fifth type of nitrogen gas generator, in which the recycle function is added to the fourth type of nitrogen gas generator.

The present invention may also be modified to a nitrogen gas supply system 500 according to a fourth embodiment of the present invention for dry-cut working machine 1, as illustrated in FIGS. 17 and 18. In the fourth embodiment, the nitrogen gas supply system 500 applies the fourth type of the nitrogen gas generator 40 as shown in FIG. 13 to the dry-cut working machine 1 of the second embodiment, which is shown in FIG. 10. As illustrated in FIG. 17, the used nitrogen gas $N_2$' after completion of working is actively collected by the splash guard SG completely closing the space around the space for working and by a breathing device KU as the collecting means positioned inside of the splash guard SG. The collected used nitrogen gas $N_2$' is sent to a compressor SC of a nitrogen gas generator 50, a fifth type of nitrogen gas generator. The transport route of the used nitrogen gas $N_2$' via a transport means comprising a piping P2 is in the order of a filter F and a switch valve V. The filter F serves as another collection means for removing dust, and the switch valve V switches the direction of the used nitrogen gas $N_2$' between to the outside and to the compressor SC. If the used nitrogen gas $N_2$' is in high temperature and the cooling thereof should be carried out, a cooler (not shown) may be provided in the piping P2. As the other structure is basically the same as that of the nitrogen gas generator 40 as illustrated in FIG. 13, the same numerals are given thereto, and the detailed explanation thereof will not be made.

As illustrated in FIGS. 17 and 18, according to the fifth type of nitrogen gas generator 50, after the working is completed, the used nitrogen gas $N_2$' is collected by the collecting means comprising the breathing device KU and the filter F, and the collected used nitrogen gas $N_2$' is then compressed again and supplied to the absorption element Ko. Consequently, the generation, collection and recycle of the nitrogen gas remarkably improve, thereby the effective blow and supply of the nitrogen gas at the machining point MP of the tool 5 can be carried out under the lower running costs.

Figure 19:
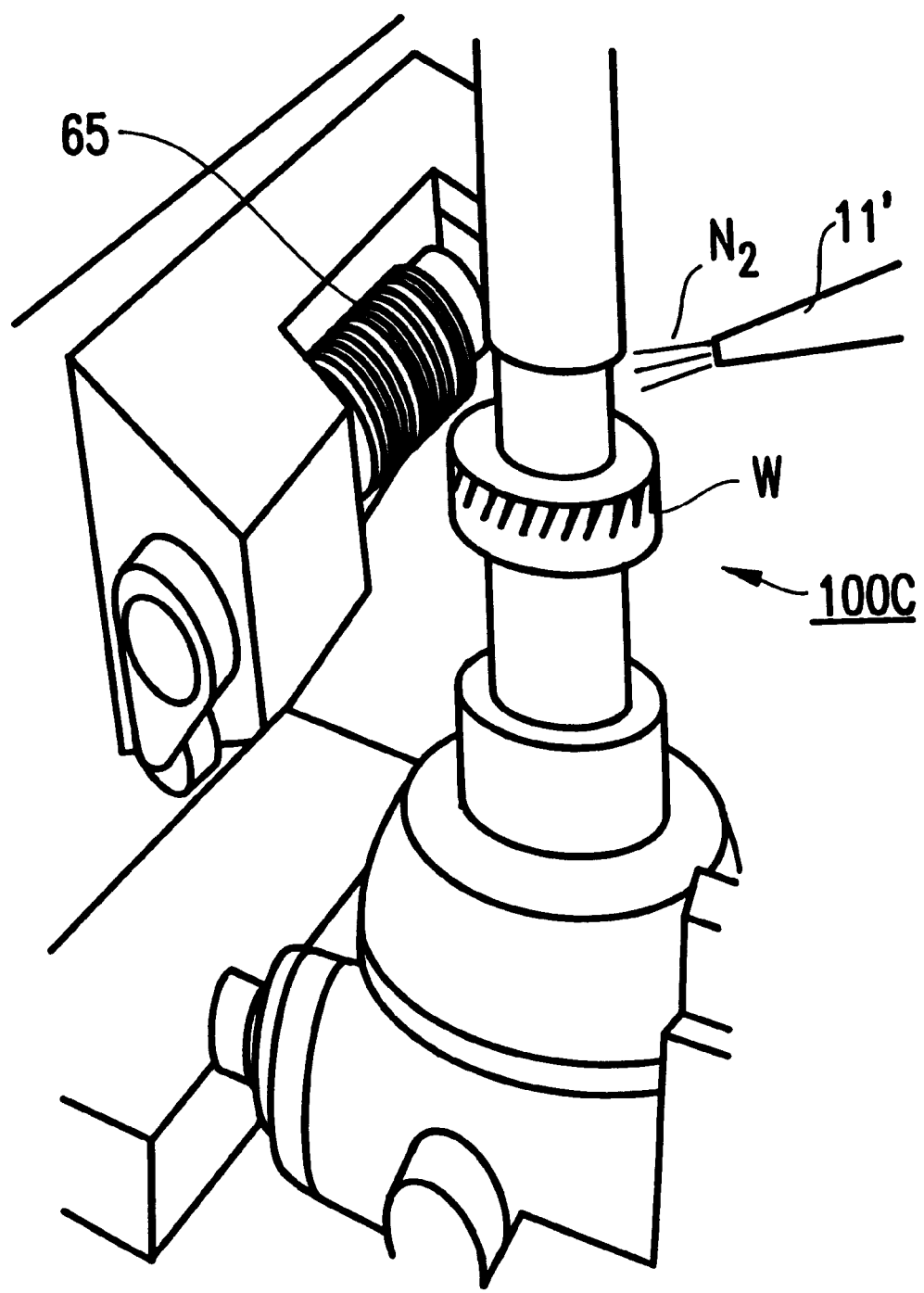
FIG. 19 is a perspective view according to a fifth embodiment of the present invention, in which the working machine is applied to a gear cutting machine.

The working machine 1 to which the present invention may be applied is not limited to the machining center or the milling machine as illustrated in FIGS. 1 through 3. In this connection, there is provided a fifth embodiment of the present invention as illustrated in FIG. 19 in which a gear cutting machine 600, which cuts and forms the gear from the workpiece W by a cutting tool 65 such as a gear hob, the nitrogen gas $N_2$ is blown out of the blowoff nozzle 11' toward the machining point of the cutting tool 65 for the workpiece W. Accordingly, the dry-cut can also be carried out by this nitrogen gas supply system 100C according to the fifth embodiment.

Figure 20:
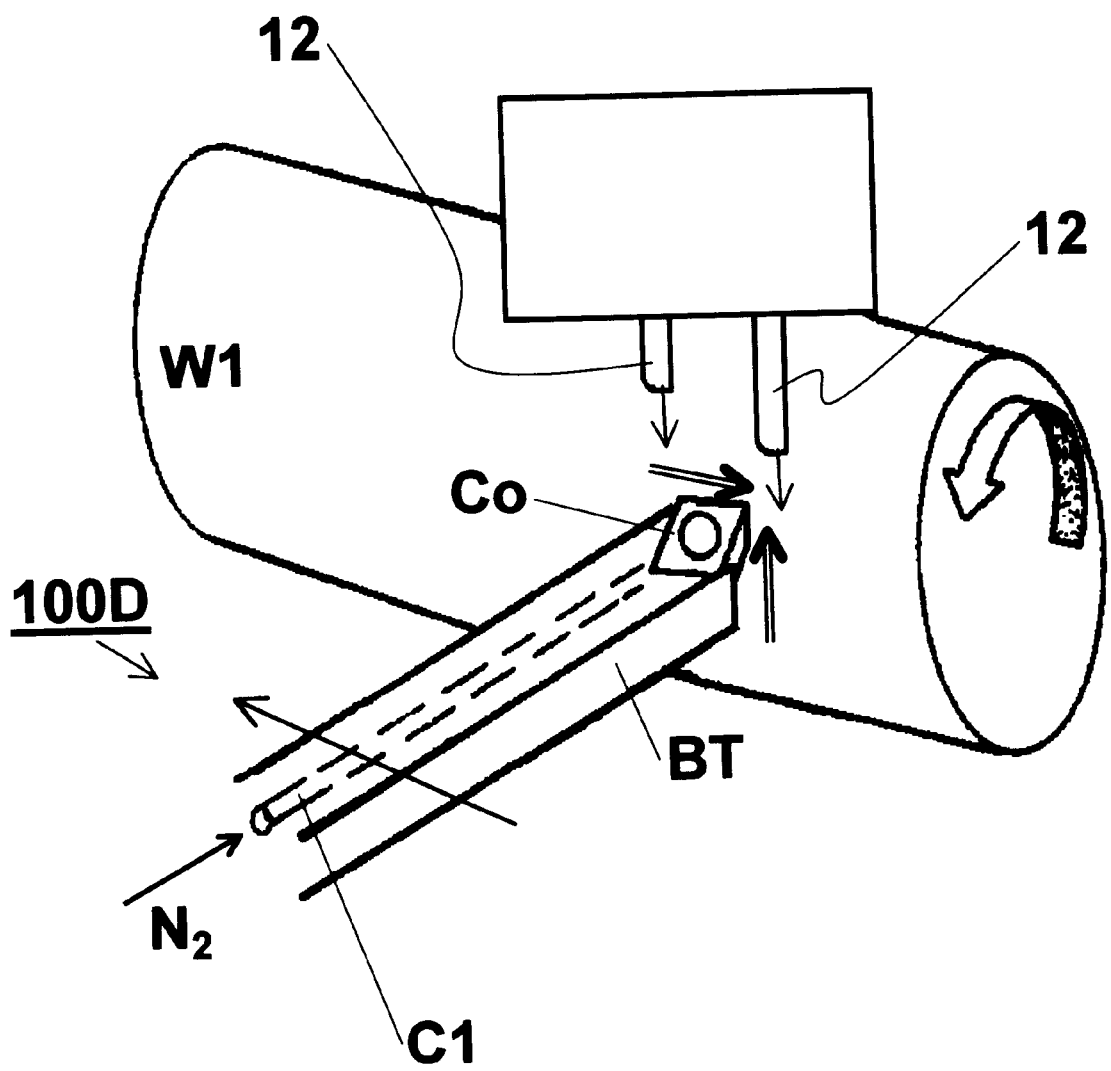
FIG. 20 is a view according to a sixth embodiment of the present invention, in which the working machine is applied to a lathe.

Further, there is provided a nitrogen gas supply system 100D applied to a lathe 700 according to a sixth embodiment of the present invention as illustrated in FIG. 20. As for the lathe 700, a rotated workpiece W1 is cut by a tip Co of a fixed bite (fixed tool used for lathe) BT. In the sixth embodiment, the blow of the nitrogen gas to the machining point may be carried out by a nozzle 12, or by the direct blow from a center hole C1 penetrating through the axis of the bite BT.

The same function and effect as those of the working machine 1 applied to machining center or milling machine, may also be obtained by this lathe 700, to which the nitrogen gas supply system 100D for dry-cut working machine according to the sixth embodiment is applied. Further, the concept of the present invention may be applied to any other working machine for cutting of workpiece, or for grinding of workpiece by grinding stone. It is not always necessary to be provided with the splash guard for each working machine, but the splash guard may be necessary when the effect and function of the nitrogen gas should be strengthened. Therefore, when still stronger effect and function are desired, the machining part for the workpiece should preferably be closed by another shield in addition to the present splash guard.

Figure 21:
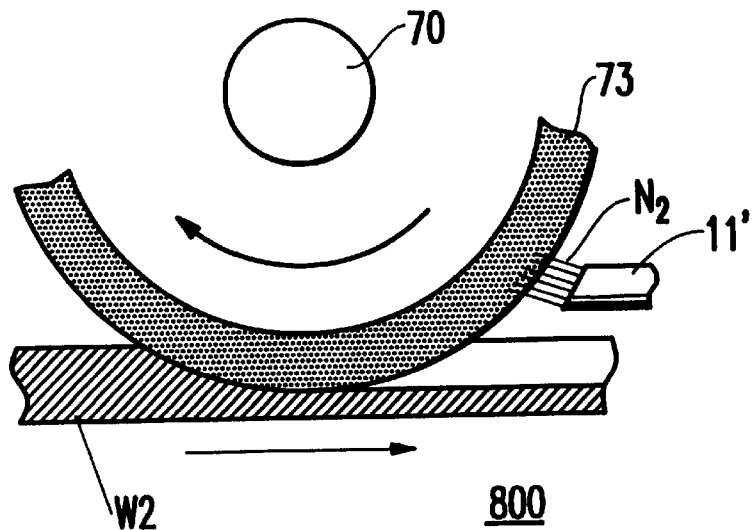
FIG. 21 is an expanded sectional view according to a seventh embodiment of the present invention, in which the working machine is applied to a grinding machine.
Figure 22:
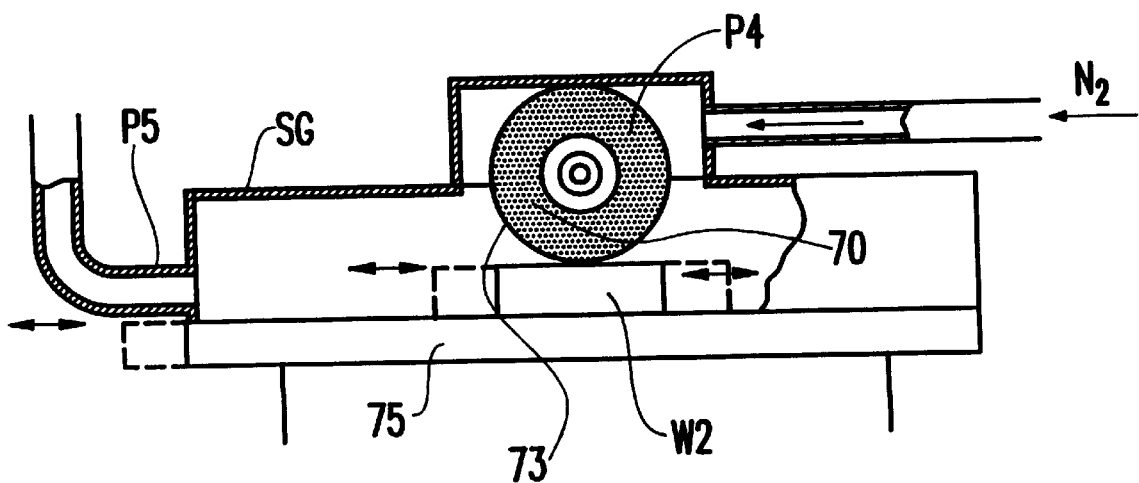
FIG. 22 is an expanded sectional view according to the seventh embodiment of the present invention, showing a structure of a grinding machine provided with a splash guard.

FIGS. 22 and 23 illustrate a seventh embodiment of the present invention in which the working machine 1 is applied to a grinding machine 800. FIG. 21 shows the structure that a grinding stone 73 attached to the spindle 70 grinds a surface of a workpiece W2, in which the nitrogen gas $N_2$ is directly blown from the nozzle 11' to the surface of the grinding stone 73. FIG. 22 shows the structure in which the splash guard SG completely closes the space around the workpiece W2 and the grinding stone 73 on a table 75. The nitrogen gas $N_2$ is inducted from a blowoff pipe P4 into this closed space, then the used nitrogen gas is exhausted to the outside from an exhaust pipe P5 in order to be collected.

When the grinding of the workpiece W2 is carried out, the working part becomes in the same no-oxygen state as that when the cutting is carried out by the machining center or the milling machine. Consequently, the working part may effectively be cooled and prevented from being oxidized. As for the nitrogen gas concentration of grinding, the most appropriate gas concentration between 90%–100% is maintained similar to the case of cutting.

What is claimed is:

1. A nitrogen gas supply system for a dry-cut working machine, comprising:
    a nitrogen gas generator which separates and extracts only nitrogen gas existing in the atmosphere, said generator comprising heating means for preventing condensation of moisture in said atmosphere prior to extracting and separating said nitrogen gas; and
    a supplier which sends said nitrogen gas from said nitrogen gas generator to a working part of a working machine.

2. The nitrogen gas supply system for dry-cut working machine as claimed in claim 1, wherein said nitrogen gas generator comprising a air compressing means which compresses the atmosphere to be within a range of 0.2–1.0 Mpa (2–10 kg/cm$^2$) in order to obtain a compressed air, a drying means which removes oil and moisture from said compressed air, a extracting means which extracts only nitrogen gas from said compressed air, and a gas concentration maintaining means provided with a flow control valve and flow volume meter or with a flow control valve and an oxygen concentration meter in order to maintain a concentration of said nitrogen gas to be within a range of 90%–100%.

3. The nitrogen gas supply system for dry-cut working machine as claimed in claim 2, wherein said air compressing means is a compressed air supply running through a factory via piping within a range of 0.4–0.8 Mpa (4–8 kg/cm$^2$).

4. The nitrogen gas supply system for dry-cut working machine as claimed in claim 2, wherein said air compressing means is a compressed air supply running through a factory via piping within a range of 0.4–0.8 Mpa (4–8 kg/cm$^2$), and a pressure intensifying means which further intensifies pressure of said compressed air supply to be in a range of 0.6–1.0 Mpa (6–10 kg/cm$^2$).

5. The nitrogen gas supply system for dry-cut working machine as claimed in claim 2, wherein said air compressing means is an air compressor which generates a compressed air within a range of 0.2–1.0 Mpa (2–10 kg/cm$^2$).

6. The nitrogen gas supply system for dry-cut working machine as claimed in claim 2, wherein said extracting means is a filter element which separates only said nitrogen gas from said compressed air.

7. The nitrogen gas supply system for dry-cut working machine as claimed in claim 2, wherein said extracting means is an absorption element which separates only said nitrogen gas from said compressed air.

8. The nitrogen gas supply system for dry-cut working machine as claimed in claim 2, wherein said dry-cut working machine is a machining center, a milling machine or a gear cutting machine.

9. The nitrogen gas supply system for dry-cut working machine as claimed in claim 2, wherein said dry-cut working machine is a lathe.

10. The nitrogen gas supply system for dry-cut working machine as claimed in claim 2, wherein said dry-cut working machine is a grinding machine which grinds a workpiece by a grinding tool.

11. A nitrogen gas supply system for a dry-cut working machine, comprising:
    a nitrogen gas generator which separates and extracts only nitrogen gas existing in the atmosphere, said generator comprising heating means for preventing condensation of moisture in said atmosphere prior to extracting and separating said nitrogen gas;
    a supplier which sends said nitrogen gas from said nitrogen gas generator to a working machine; and
    a blower which convergently blows said nitrogen gas at a cutting tip in a working part of said working machine.

12. The nitrogen gas supply system for dry-cut working machine as claimed in claim 11, wherein said nitrogen gas generator comprising a air compressing means which compresses the atmosphere to be within a range of 0.2–1.0 Mpa (2–10 kg/cm$^2$) in order to obtain a compressed air, a drying means which removes oil and moisture from said compressed air, a extracting means which extracts only nitrogen gas from said compressed air, and a gas concentration maintaining means provided with a flow control valve and flow volume meter or with a flow control valve and an oxygen concentration meter in order to maintain a concentration of said nitrogen gas to be within a range of 90%–100%.

13. The nitrogen gas supply system for dry-cut working machine as claimed in claim 12, wherein said air compressing means is a compressed air supply running through a factory via piping within a range of 0.4–0.8 Mpa (4–8 kg/cm$^2$).

14. The nitrogen gas supply system for dry-cut working machine as claimed in claim 12, wherein said air compressing means is a compressed air supply running through a factory via piping within a range of 0.4–0.8 Mpa (4–8 kg/cm$^2$), and a pressure intensifying means which further intensifies pressure of said compressed air supply to be in a range of 0.6–1.0 Mpa (6–10 kg/cm$^2$).

15. The nitrogen gas supply system for dry-cut working machine as claimed in claim 12, wherein said air compressing means is an air compressor which generates a compressed air within a range of 0.2–1.0 Mpa (2–10 kg/cm$^2$).

16. The nitrogen gas supply system for dry-cut working machine as claimed in claim 12, wherein said extracting means is a filter element which separates only said nitrogen gas from said compressed air.

17. The nitrogen gas supply system for dry-cut working machine as claimed in claim 12, wherein said extracting means is an absorption element which separates only said nitrogen gas from said compressed air.

18. The nitrogen gas supply system for dry-cut working machine as claimed in claim 12, wherein said dry-cut working machine is a machining center, a milling machine or a gear cutting machine.

19. The nitrogen gas supply system for dry-cut working machine as claimed in claim 12, wherein said dry-cut working machine is a lathe.

20. The nitrogen gas supply system for dry-cut working machine as claimed in claim 12, wherein said dry-cut working machine is a grinding machine which grinds a workpiece by a grinding tool.

21. A nitrogen gas supply system for a dry-cut working machine, comprising:
  a nitrogen gas generator which separates and extracts only nitrogen gas existing in the atmosphere;
  a supplier which sends said nitrogen gas from said nitrogen gas generator to a working part of a working machine;
  a breathing device serving as a collecting means for collecting said nitrogen gas after completion of working; and
  piping serving as a transfer means for transferring collected nitrogen gas.

22. The nitrogen gas supply system for dry-outworking machine as claimed in claim 21, wherein said collecting means comprises a breathing device and a filter.

23. The nitrogen gas supply system for a dry-cut working machine, comprising:
  a nitrogen gas generator which separates and extracts only nitrogen gas existing in the atmosphere;
  a supplier which sends said nitrogen gas from said nitrogen gas generator to a working machine;
  a blower which convergently blows said nitrogen gas at a cutting tip in a working part of said working machine;
  a breathing device serving as a collecting means for collecting said nitrogen gas after completion of working; and
  a piping serving as a transfer means for transferring a collected nitrogen gas.

24. The nitrogen gas supply system for dry-cut working machine as claimed in claim 23, wherein said collecting means comprises a breathing device and a filter.

25. A nitrogen gas supply system for dry-cut working machine, comprising:
  a nitrogen gas generator which separates and extracts only nitrogen gas existing in the atmosphere; and
  a supplier which sends said nitrogen gas from said nitrogen gas generator to a working part of a working machine,
  wherein said nitrogen gas generator comprises:
    an air compressor which compresses the atmosphere in order to obtain a compressed air;
    a dryer for removing oil and moisture from said compressed air;
    an extractor for extracting only nitrogen gas from said compressed air;
    a gas concentration maintaining unit including a flow control valve and flow volume meter or with a flow control valve and an oxygen concentration meter; and
    a heater for preventing condensation of moisture in said compressed air after said dryer removes moisture and oil.

26. The nitrogen gas supplying system, according to claim 25, further comprising:
  a collector for suctioning and collecting nitrogen gas supplied to the working part; and
  a feeder for feeding the collected nitrogen gas to the air compressor again.

27. The nitrogen gas supplying system, according to claim 26, wherein the working machine is a milling machine, gear cutting machine, lathe or grinding machine.

28. The nitrogen gas supplying system, according to claim 25, wherein the working machine comprises a milling machine, gear cutting machine, lathe or grinding machine.

29. The nitrogen gas supply system according to claim 25, wherein said air compressor compresses the atmosphere to be within a range of 0.2–1.0 Mpa (2–10 kg/cm$^2$).

30. The nitrogen gas supply system according to claim 25, wherein said gas concentration maintaining unit maintains a concentration of said nitrogen gas to be within a range of 90% 100%.

* * * * *